US012587713B2

(12) United States Patent
Mou

(10) Patent No.: US 12,587,713 B2
(45) Date of Patent: Mar. 24, 2026

(54) SCREEN CASTING METHOD AND TERMINAL

(71) Applicant: Petal Cloud Technology Co., Ltd., Dongguan City (CN)

(72) Inventor: Lei Mou, London (GB)

(73) Assignee: PETAL CLOUD TECHNOLOGY CO., LTD., Dongguan (CN)

( * ) Notice: Subject to any disclaimer, the term of this patent is extended or adjusted under 35 U.S.C. 154(b) by 293 days.

(21) Appl. No.: 18/000,981

(22) PCT Filed: Jun. 5, 2021

(86) PCT No.: PCT/CN2021/098499
§ 371 (c)(1),
(2) Date: Dec. 7, 2022

(87) PCT Pub. No.: WO2021/249318
PCT Pub. Date: Dec. 16, 2021

(65) Prior Publication Data
US 2023/0217081 A1     Jul. 6, 2023

(30) Foreign Application Priority Data

Jun. 8, 2020     (CN) .......................... 202010514417.5

(51) Int. Cl.
*H04N 21/488* (2011.01)
*H04N 21/41* (2011.01)
*H04N 21/485* (2011.01)
(52) U.S. Cl.
CPC ..... *H04N 21/4882* (2013.01); *H04N 21/4122* (2013.01); *H04N 21/4126* (2013.01); *H04N 21/4858* (2013.01); *H04N 21/4884* (2013.01)

(58) Field of Classification Search
CPC ........... H04N 21/4882; H04N 21/4122; H04N 21/4126; H04N 21/4858; H04N 21/4884;
(Continued)

(56) References Cited

U.S. PATENT DOCUMENTS 10,347,293 B1 * 7/2019 Skinner ................. G06F 3/1462
10,516,634 B2 * 12/2019 Ishizuka ............... H04L 51/226
(Continued)

FOREIGN PATENT DOCUMENTS

CN          101179347 A     5/2008
CN          105872653 A     8/2016
(Continued)

OTHER PUBLICATIONS

Smblott-Github, "Castnow—Readme.md," Github, Feb. 13, 2018, XP093108735, 5 pages.

*Primary Examiner* — Nathan J Flynn
*Assistant Examiner* — Christine A Kurien
(74) *Attorney, Agent, or Firm* — Conley Rose, P.C.

(57) ABSTRACT

A screen casting method is applied to a source device having a display and a speaker. The screen casting method includes receiving first data and decoding the first data, displaying the decoded first data through the display and/or outputting the decoded first data through the speaker, receiving text information from the server and parsing the text information, and displaying the parsed text information through the display, where the text information is associated with the first data. A first operation of performing screen casting to a target device is detected, and in response to the first operation, sending a download address of the first data and a download address of the text information to the target device.

23 Claims, 16 Drawing Sheets

(58) Field of Classification Search
 CPC ......... H04N 21/43615; H04N 21/4363; H04N
  21/47217; H04N 21/485; H04N 21/4854;
   G06F 3/1454
 See application file for complete search history.

(56)                    References Cited

U.S. PATENT DOCUMENTS

| | | | |
|---|---|---|---|
| 2013/0042293 A1 | 2/2013 | Wang | |
| 2015/0100993 A1 | 4/2015 | Lee et al. | |

FOREIGN PATENT DOCUMENTS

| | | | |
|---|---|---|---|
| CN | 108063952 A | 5/2018 | |
| CN | 108156480 A | 6/2018 | |
| CN | 108810594 A | 11/2018 | |
| CN | 110119241 A | 8/2019 | |
| EP | 2916519 A1 | 9/2015 | |

\* cited by examiner

Electronic device 100

301

303

307                309

310

600

800

900

Receive a video stream from a server
and play a video — 901

Determine whether
a screen casting operation
is detected — 903

No

Yes

Determine whether
a second terminal is selected
for screen casting — 905

No

Yes

Determine whether
a bullet comment is
currently displayed — 907

Yes

Send a bullet comment data download address and a video
data download address to the second terminal — 909

1001

Receive a screen casting request from a first terminal

1003

Receive a video data download address and a bullet comment data download address Yes

1005

Request a video and a bullet comment from a server by using the download addresses

1007

Receive a video stream and bullet comment data

1009

Display the video and the bullet comment

SCREEN CASTING METHOD AND TERMINAL

CROSS-REFERENCE TO RELATED APPLICATIONS

This is a U.S. National Stage of International Patent Application No. PCT/CN2021/098499 filed on Jun. 5, 2021, which claims priority to Chinese Patent Application No. 202010514417.5 filed on Jun. 8, 2020, both of which are hereby incorporated by reference in their entireties.

TECHNICAL FIELD

This application relates to the field of terminal technologies, and in particular, to a screen casting method and a terminal.

BACKGROUND

With development of intelligent terminals, for example, a mobile phone, a tablet computer, a smart wearable device, a smart television, and a smart home, scenarios in which a user connects a plurality of terminal devices in a wired or wireless manner and shares local data or multimedia data between the terminal devices become increasingly common, and operations of performing multi-device connection and sharing become increasingly convenient. Screen mirroring, multi-screen interaction, streaming media push, and the like are currently mainstream wireless projection modes, and are mainly supported by technologies or protocols such as AirPlay, Miracast, WiDi, and Digital Living Network Alliance (DLNA). Protocols such as AirPlay and DLNA that support a streaming mode, that is, support only streaming transmission of video content instead of mirroring replication of an entire display interface, where AirPlay is an AirPlay technology of Apple in iOS, implement interconnection between a wireless network and a wired network that include a personal computer, a consumer appliance, and a mobile device, and provide a method for obtaining content on one device and playing the content on another device.

Specifically, AirPlay. and DLNA may push streaming media for accessing a video application (for example, iQIYI, Youku, or Youtube) on a smartphone to a large screen, for example, a smart television, to provide a smooth streaming media push experience for a user. Therefore, devices that support AirPlay or DLNA can discover other devices that support a same protocol in a same local area network and initiate video screen casting. In addition, some screen casting applications may also implement streaming media push between two intelligent devices by using the foregoing protocols or a proprietary protocol. For example, when the screen casting application is pre-installed on both a smartphone and a smart television, a user may perform screen casting by scanning a QR code on the smart television, and the two devices do not need to be in a same local area network to perform screen casting by using the screen casting application. In addition, development of a streaming media application further promotes requirements of the user on entertainment and participation of various streaming media. For example, when watching a TV series or a variety show program on iQIYI, a user may experience a "scrolling comment" function, where the scrolling comment refers to a commentary subtitle popped up when the user watches a video on a network, and when watching the video, the user may view the scrolling comment of the video, and may also make a comment synchronously to form a scrolling comment. Different from a conventional comment on a video, a scrolling comment appears only at a specific time point in the video. Therefore, scrolling comments sent at a same moment basically have a same theme, and when making a comment, the user is provided with an experience of interacting with another user in real time.

In a method for perforating screen casting by using the foregoing screen casting protocols such as AirPlay and DLNA or the screen casting applications, a scrolling comment corresponding to a video cannot be pushed when the video is transmitted in a streaming mode. Therefore, a streaming screen casting method that can be used to simultaneously perform screen casting on a video and a scrolling comment needs to be provided.

SUMMARY

This application provides a screen casting method, an electronic device for screen casting, and a terminal. The screen casting method implements screen casting of text information, and improves screen casting experience of a user.

According to a first aspect, this application provides a screen casting method, applied to a source device having a display and a speaker. The method includes: receiving first data from a server and decoding the first data, and displaying the decoded first data through the display, and/or outputting the decoded first data through the speaker; receiving text information from the server and parsing the text information, and displaying the parsed text information through the display, where the text information is associated with the first data; detecting a first operation of performing screen casting to a target device; and in response to the first operation, sending a download address of the first data and a download address of the text information to the target device.

According to the first aspect, in a first implementation of the first aspect, the first data is a video stream, the text information is a scrolling comment or subtitle, and the displaying the parsed text information through the display includes: displaying, in a superimposition manner, the scrolling comment or subtitle on the video stream displayed on the display, where the scrolling comment or subtitle displayed in the superimposition manner is associated with the video stream in terms of time. According to the screen casting method, download addresses of the video stream and the scrolling comment/subtitle may be sent to the target device, to implement simultaneous screen casting of the video stream and the scrolling comment/subtitle.

According to the first aspect, in a second implementation of the first aspect, the method further includes: sending a display parameter of the text information to the target device, where the display parameter includes at least one of a font, a font size, a color, transparency, an animation speed, and a display area of displaying the text information. The display parameter of the text information is sent to the target device, so that the parameter that is set by a user at the source device end can be applied to the target device end.

According to the first aspect, in a third implementation of the first aspect, the method further includes: sending first text information to the target device, where the first text information is associated with the first data. After the device performs screen casting to the target device, the user may further send text information to the source device, to enhance interaction experience of the user.

According to the first aspect, in a fourth implementation of the first aspect, the method further includes: detecting a second operation of terminating screen casting to the target device, and receiving a display parameter of the text information from the target device, where the display parameter includes at least one of a font, a font size, a color, transparency, an animation speed, and a display area of displaying the text information. When screen casting is terminated, the parameter that is set by the user on the target device may be applied to the source device end, to continue setting of displaying the text information by the user on the target device.

According to a second aspect, this application provides a screen casting method, applied to a source device having a first display and a first speaker. The method includes: receiving first data from a server and decoding the first data, and displaying the decoded first data through the first display, and/or outputting the decoded first data through the first speaker; in response to a first operation of performing screen casting on the first data, sending a download address of the first data to a target device; and in response to a second operation of performing screen casting on text information, sending a download address of the text information to the target device, where the text information is associated with the first data.

According to the second aspect, in a first implementation of the second aspect, the first data is a video stream, the text information is a scrolling comment or subtitle, and the method further includes: The target device downloads a first part of the video stream by using the download address of the first data, and displays the first part of the video stream through a second display of the target device. The target device downloads the scrolling comment or subtitle by using the download address of the text information, and displays a first part of the scrolling comment or subtitle on the second display in a superimposition manner, where the first part of the scrolling comment or subtitle displayed in the superimposition manner is associated with the first part of the video stream in terms of time. According to the screen casting method, download addresses of the video stream and the scrolling comment/subtitle may be sent to the target device, to implement simultaneous screen casting of the video stream and the scrolling comment/subtitle.

According to the second aspect, in a second implementation of the second aspect, the method further includes: sending a display parameter of the text information to the target device, where the display parameter includes at least one of a font, a font size, a color, transparency, an animation speed, and a display area of displaying the text information. The display parameter of the text information is sent to the target device, so that the parameter that is set by a user at the source device end can be applied to the target device end.

According to the second aspect, in a third implementation of the second aspect, the method further includes: sending first text information to the target device, where the first text information is associated with the first data. After the device performs screen casting to the target device, the user may further send text information to the source device, to enhance interaction experience of the user.

According to the second aspect, in a fourth implementation of the second aspect, the method further includes: detecting a third operation of terminating screen casting to the target device, and receiving a display parameter of the text information from the target device, where the display parameter includes at least one of a font, a font size, a color, transparency, an animation speed, and a display area of displaying the text information. When screen casting is terminated, the parameter that is set by the user on the target device may be applied to the source device end, to continue setting of displaying the text information by the user on the target device.

According to a third aspect, this application provides a screen casting method, used for screen casting on a target device having a display and a speaker. The method includes: receiving a download address of first data; requesting, by using the download address of the first data, a server to deliver the first data, and displaying the first data through the display, and/or outputting the first data through the speaker; receiving a download address of text information, where the text information is associated with the first data; and requesting, by using the download address of the text information, the server to deliver the text information, and displaying the text information through the display.

According to the third aspect, in a first implementation of the third aspect, the first data is a video stream, the text information is a scrolling comment or subtitle, and the displaying the text information through the display includes: displaying, in a superimposition manner, the scrolling comment or subtitle on the video stream displayed on the display, where the scrolling comment or subtitle displayed in the superimposition manner is associated with the displayed video stream in terms of time. According to the screen casting method, download addresses of the video stream and the scrolling comment/subtitle may be received from a source device, to implement simultaneous screen casting of the video stream and the scrolling comment/subtitle.

According to the third aspect, in a second implementation of the third aspect, the method further includes: receiving a display parameter of the text information, and displaying the text information on the display based on the display parameter, where the display parameter includes at least one of a font, a font size, a color, transparency, an animation speed; and a display, area of displaying the text information. The display parameter of the text information is received from the source device, so that the parameter that is set by a user at the source device end can be applied to the target device end.

According to the third aspect, in a third implementation of the third aspect, the method further includes: detecting a first operation of sending first text information; and in response to the first operation, displaying the first text information on the display in a superimposition manner, where the first text information is associated with the first data. After screen casting, the user may further send text information to the target device, to enhance interaction experience of the user.

According to the third aspect, in a fourth implementation of the third aspect, the method, further includes: detecting a second operation of setting a display parameter of the text information; and in response to the second operation, displaying the text information on the display based on the specified display parameter, where the display parameter includes at least one of a font, a font size, a color, transparency, an animation speed, and a display area of displaying the text information. After screen casting, the user may further set the display parameter of the text information by using the target device, to enhance interaction experience of the user.

According to the fourth implementation of the third aspect, in a fifth implementation of the second aspect, the method further includes: receiving a request for terminating screen casting from a source device; and sending the specified display parameter to the source device. When screen casting is terminated, the parameter that is set by the user on the target device may be sent to the source device end, to continue, on the source device, setting of displaying the text information by the user on the target device.

According to a fourth aspect, this application provides a terminal, including a display, a memory, and a processor. The memory stores one or more programs, and when the processor executes the one or more programs, the terminal is enabled to implement the method according to any one of the foregoing implementations. According to the method in any one of the foregoing implementations, the terminal may implement screen casting of a scrolling comment or subtitle, and display, in a superimposition manner, the scrolling comment or subtitle on a casted video, so that screen casting experience of a user can be improved.

According to a fifth aspect, this application provides a computer-readable storage medium, including instructions. When the instructions are run on an electronic device, the electronic device is enabled to perform the method according to any one of the foregoing implementations.

According to a sixth aspect, this application provides an electronic device for screen casting, having a display. The electronic device includes: a communications module, configured to receive first data and text information from a server, where the text information is associated with the first data; a decoding and parsing unit, configured to: decode the first data and parse the text information; a display unit, configured to: display the decoded first data and display the parsed text information, where the text information is displayed on the first data in a superimposition manner; and a detection unit, configured to detect a first operation of performing screen casting to a target device. In response to the detected first operation, the communications module sends a download address of the first data and a download address of the text information to the target device. The electronic device implements screen casting of the text information, so that screen casting experience of a user can be improved.

According to the sixth aspect, in a first implementation of the sixth aspect, the first data is a video stream, the text information is a scrolling comment or subtitle, and the scrolling comment or subtitle is associated with the video stream in terms of time.

According to the sixth aspect, in a second implementation of the sixth aspect, the electronic device further includes a text control unit, configured to: when detecting a second operation of sending first text information, indicate the communications module to send the first text information to the target device, where the first text information is associated with the first data. The text control unit sends text information edited by the user, so that real-time interaction experience can be provided for the user.

According to a seventh aspect, this application provides an electronic device for screen casting. The electronic device includes: a communications module, configured to: when receiving a screen casting request from a source device, further receive a download address of first data and a download address of text information from the source device, where the text information is associated with the first data, and request and receive the first data and the text information from a server by using the download address of the first data and the download address of the text information; and a display unit, configured to: display the first data, and display the text information on the first data in a superimposition manner. The electronic device may simultaneously perform screen casting on and display the first data and the text information associated with the first data, so that screen casting experience of a user can be improved.

According to the seventh aspect, in a first implementation of the seventh aspect, the first data is a video stream, the text information is a scrolling comment or subtitle, and the display unit displays the scrolling comment or subtitle on the video stream in a superimposition manner, where the scrolling comment or subtitle displayed in the superimposition manner is associated with the video stream in terms of time.

According to the seventh aspect, in a second implementation of the seventh aspect, the electronic device further includes a text control unit, configured to: when detecting a first operation of sending first text information, indicate the display unit to display the first text information on the first data in a superimposition manner, where the first text information is associated with the first data. The text control unit sends text information edited by the user, so that real-time interaction experience can be provided for the user.

DESCRIPTION OF EMBODIMENTS

The following describes embodiments of this application with reference to accompanying drawings in embodiments of this application.

It should be noted that descriptions of "first", "second", and the like in embodiments of this application are used to distinguish different messages, devices, modules, applications, and the like, do not indicate a sequence, and do not impose a limitation that "first" and "second" are different types. The descriptions of "first", "second", and the like do not limit a quantity either. For example, "first application" may be one "first application", or may be a plurality of "first applications".

A term "A and/or B" in embodiments of this application describes only an association relationship for describing associated objects and represents that there may be three relationships. For example, only A exists, both A and B exist, and only B exists. In addition, a character "/" in embodiments of this application generally indicates an "or" relationship between the associated objects.

Figure 1A:
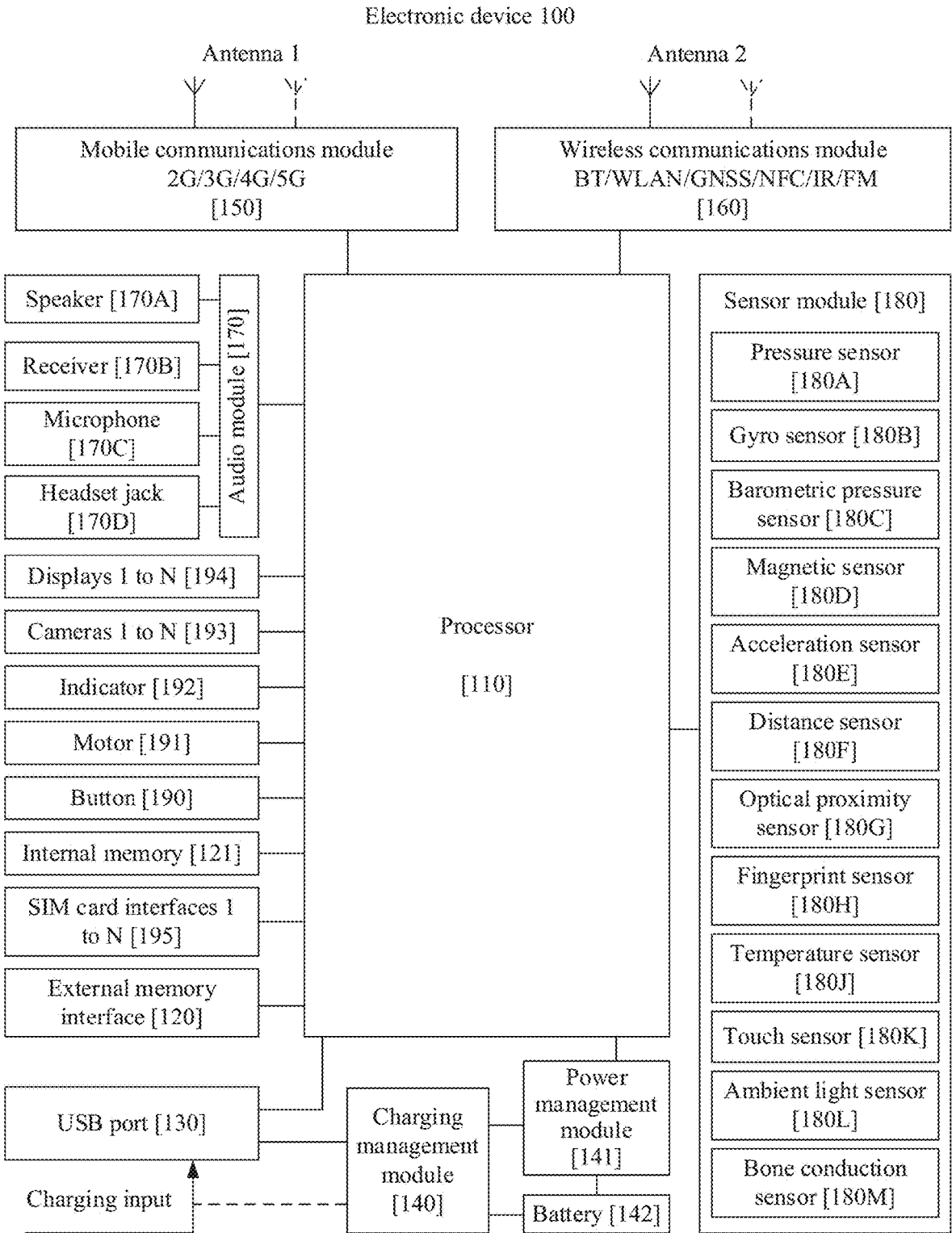
FIG. 1A is a schematic diagram of a structure of an electronic device according to an embodiment of this application.

The method provided in embodiments of this application may be applied to an electronic device 100 shown in FIG. 1A. FIG. 1A is a schematic diagram of a structure of an electronic device 100.

The electronic device 100, for example, an intelligent terminal, may include a processor 110, an external memory interface 120, an internal memory 121, a universal serial bus (universal serial bus, USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the electronic device 100. In some other embodiments of this application, the electronic device 100 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated into one or more processors.

The controller may generate an operation control signal based on an instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data that has been used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identification module (subscriber identification module, SIM) interface, a universal serial bus (universal serial bus, USB) port, and/or the like.

The I2C interface is a two-way synchronization serial bus, and includes one serial data line (serial data line, SDA) and one serial clock line (serial clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. The PCM interface may also be used to perform audio communication, and sample, quantize, and code an analog signal. The UART interface is a universal serial data bus, and is configured to perform asynchronous communication.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI, to implement a photographing function of the electronic device 100. The processor 110 communicates with the display 194 through the DSI interface, to implement a display function of the electronic device 100.

The GPIO interface may be configured by software. The GPIO interface may be configured as a control signal or a data signal. In some embodiments, the GPIO interface may be configured to connect the processor 110 to the camera 193, the display 194, the wireless communications module 160, the audio module 170, the sensor module 180, or the like. The GPIO interface may alternatively be configured as the I2C interface, the I2S interface, the DART interface, the MIPI interface, or the like.

The USB port 130 is a port that conforms to a USB standard specification, and may be specifically a mini USB port, a micro USB port, a USB Type-C port, or the like. It may be understood that an interface connection relationship between the modules shown in this embodiment of the present invention is merely an example for description, and does not constitute a limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from the charger. The power management module 141 is configured to connect to the battery 142, the charging management module 140, and the processor 110, A wireless communication function of the electronic device 100 may be implemented by using the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna in the electronic device 100 may be configured to cover one or more communication frequency hands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communications module 150 may provide a wireless communication solution that includes 2G/3G/4G/5G or the like and that is applied to the electronic device 100. The mobile communications module 150 may include at least one filter, a switch, a power amplifier, a low noise amplifier (low noise amplifier, INA), and the like. The mobile communications module 150 may receive an electromagnetic wave by using the antenna 1, perform processing such as filtering or amplification on the received electromagnetic wave, and transmit the electromagnetic wave to the modem processor for demodulation. The mobile communications module 150 may further amplify a signal modulated by the modem processor, and convert the signal into an electromagnetic wave by using the antenna 1 for radiation. In some embodiments, at least some functional modules in the mobile communications module 150 may be disposed in the processor 110. In some embodiments, at least some functional modules of the mobile communications module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate the received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 170A, the receiver 170B, or the like), or displays an image or a video by the display 194. In some embodiments, the modem processor may be an independent component. In some other embodiments, the modem processor may be independent of the processor 110, and is disposed in a same device as the mobile communications module 150 or another functional module.

The wireless communications module 160 may provide a wireless communication solution that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like and that is applied to the electronic device 100. The wireless communications module 160 may be one or more components integrating at least one communications processor module. The wireless communications module 160 receives an electromagnetic wave by the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave by using the antenna 2 for radiation.

In some embodiments, in the electronic device 100, the antenna 1 and the mobile communications module 150 are coupled, and the antenna 2 and the wireless communications module 160 are coupled, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access. WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLO-NASS), a BeiDou navigation satellite system (BeiDou navigation satellite system, BDS), a quasi-zenith satellite system (quasi-zenith satellite system, QZSS), and/or a satellite based augmentation system (satellite based augmentation system, SEAS).

The electronic device 100 may implement a display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the electronic device 100 may include one or N displays 194, where N is a positive integer greater than 1.

The electronic device 100 may implement a photographing function by using the ISP, the camera 193, the video codec, the GPU, the display 194, the application processor, and the like.

The ISP is configured to process data fed back by the camera 193. The camera 193 is configured to capture a static image or a video. An optical image of an object is generated through the lens, and is projected onto a photosensitive element.

The digital signal processor is configured to process a digital signal, and may process another digital signal in addition to processing the digital image signal. For example, when the electronic device 100 selects a frequency, the digital signal processor is configured to perform Fourier transform on frequency energy, and the like.

The video codec is configured to: compress or decompress a digital video. The electronic device 100 may support one or more video codecs. In this way, the electronic device 100 may play back or record videos in a plurality of coding formats, for example, moving picture experts group (moving picture experts group, MPEG)-1, MPEG-2, MPEG-3, and MPEG-4.

The NPU is a neural-network (neural-network, NN) computing processor. The NP quickly processes input information by referring to a structure of a biological neural network, for example, with reference to a transfer mode between human brain neurons, and may further continuously perform self-learning.

The external memory interface 120 may be used to connect to an external storage card, for example, a Micro SD card, to extend a storage capability of the electronic device 100. The external storage card communicates with the processor 110 through the external memory interface 120, to implement a data storage function. For example, files such as music and videos are stored in the external storage card.

The internal memory 121 may be configured to store computer-executable program code. The executable program code includes instructions. The internal memory 121 may include a program storage area and a data storage area. The program storage area may store an operating system, an application required by at least one function (for example, a sound play function or an image play function), and the like. The data storage area may store data (for example, audio data and an address book) and the like created during use of the electronic device 100. In addition, the internal memory 121 may include a high-speed random access memory, and may further include a nonvolatile memory, for example, at least one magnetic disk storage device, a flash memory device, a universal flash storage (universal flash storage, UFS), and the like. The processor 110 runs the instructions stored in the internal memory 121 and/or the instructions stored in the memory disposed in the processor, to perform various function applications of the electronic device 100 and data processing.

In some embodiments of this application, the internal memory is further configured to store a translation application and buffer all pictures generated in a running process of the translation application. After a user exits the translation application, all the buffered pictures may automatically deleted.

The electronic device 100 may implement an audio function such as music playing or recording by using the audio module 170, the speaker 170A, the receiver 170B, the microphone 170C, the headset jack 170D, the application processor, and the like.

The audio module 170 is configured to convert digital audio information into an analog audio signal for output, and is also configured to convert analog audio input into a digital audio signal. The audio module 170 may be further configured to: code and decode an audio signal. In some embodiments, the audio module 170 may be disposed in the processor 110, or some functional modules in the audio module 170 are disposed in the processor 110.

The speaker 170A, also referred to as a "horn", is configured to convert an audio electrical signal into a sound signal. The electronic device 100 may be used to listen to music or answer a hands-free call through the speaker 170A.

The receiver 170B, also referred to as an "earpiece", is configured to convert the audio electrical signal into the sound signal. When a call is answered or voice information is received by using the electronic device 100, the receiver 170B may be put close to a human ear to listen to a voice.

The microphone 170C, also referred to as a "mike" or a "mic", is configured to convert a sound signal into an electrical signal.

The headset jack 170D is configured to connect to a wired headset. The headset jack 170D may be the USB port 130, or may be a 3.5 mm open mobile terminal platform (open mobile terminal platform, OMTP) standard interface or cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on the change in the capacitance. When a touch operation is performed on the display 194, the electronic device 100 detects intensity of the touch operation by using the pressure sensor 180A. The electronic device 100 may also calculate a touch location based on a detection signal of the pressure sensor 180A. In some embodiments, touch operations that are performed in a same touch location but have different touch operation intensity may correspond to different operation instructions. For example, when a touch operation whose touch operation intensity is less than a first pressure threshold is performed on a Messages application icon, an instruction for viewing an SMS message is executed. When a touch operation whose touch operation intensity is greater than or equal to the first pressure threshold is performed on the Messages application icon, an instruction for creating a new SMS message is performed.

The gyro sensor 180E may be configured to determine a motion posture of the electronic device 100. The barometric pressure sensor 180C is configured to measure barometric pressure. In some embodiments, the electronic device 100 calculates an altitude by using a value of the barometric pressure measured by the barometric pressure sensor 180C, to assist in positioning and navigation. The magnetic sensor 180D includes a Hall sensor. The acceleration sensor 180E may detect accelerations in various directions (usually on three axes) of the electronic device 100. The distance sensor 180E is configured to measure a distance. The electronic device 100 may measure a distance in an infrared manner or a laser manner. In some embodiments, in a photographing scenario, the electronic device 100 may measure a distance through the distance sensor 180F to implement quick focusing. The optical proximity sensor 180G may include, for example, a light-emitting diode (LED) and an optical detector, for example, a photodiode. The ambient light sensor 180L is configured to sense ambient light brightness. The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like. The temperature sensor 180J is configured to detect a temperature.

The touch sensor 180K is also referred to as a "touch device". The touch sensor 180K may be disposed on the display 194, and the touch sensor 180K and the display 194 form a touchscreen, which is also referred to as a "touchscreen". The touch sensor 180K is configured to detect a touch operation performed on or near the touch sensor 180K. The touch sensor may transfer the detected touch operation to the application processor to determine a type of the touch event. A visual output related to the touch operation may be provided through the display 194. In some other embodiments, the touch sensor 180K may also be disposed on a surface of the electronic device 100 at a location different from that of the display 194.

The bone conduction sensor 180M may obtain a vibration signal. The button 190 includes a power button, a volume button, and the like. The button 190 may be a mechanical button, or may be a touch button. The electronic device 100 may receive a key input, and generate a key signal input related to a user setting and function control of the electronic device 100. The motor 191 may generate a vibration prompt. The indicator 192 may be an indicator lamp, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1, The SIM card interface 195 may support a nano-SIM card, a micro-SIM card, a SIM card, and the like. A plurality of cards may be simultaneously inserted into a same SIM card interface 195. The plurality of cards may be of a same type or of different types. The SIM card interface 195 may be compatible with different types of SIM cards. The SIM card interface 195 may also be compatible with an external storage card. The electronic device 100 interacts with a network through the SIM card, to implement functions such as conversation and data communication. In some embodiments, the electronic device 100 uses an eSIM, that is, an embedded SIM card. The eSIM card may be embedded into the electronic device 100, and cannot be separated from the electronic device 100.

A software system of the electronic device 100 may use a layered architecture, an event-driven architecture, a micro-kernel architecture, a micro service architecture, or a cloud architecture. In embodiments of the present invention, an Android system of a layered architecture is used as an example to describe a software structure of the electronic device 100.

Figure 1B:
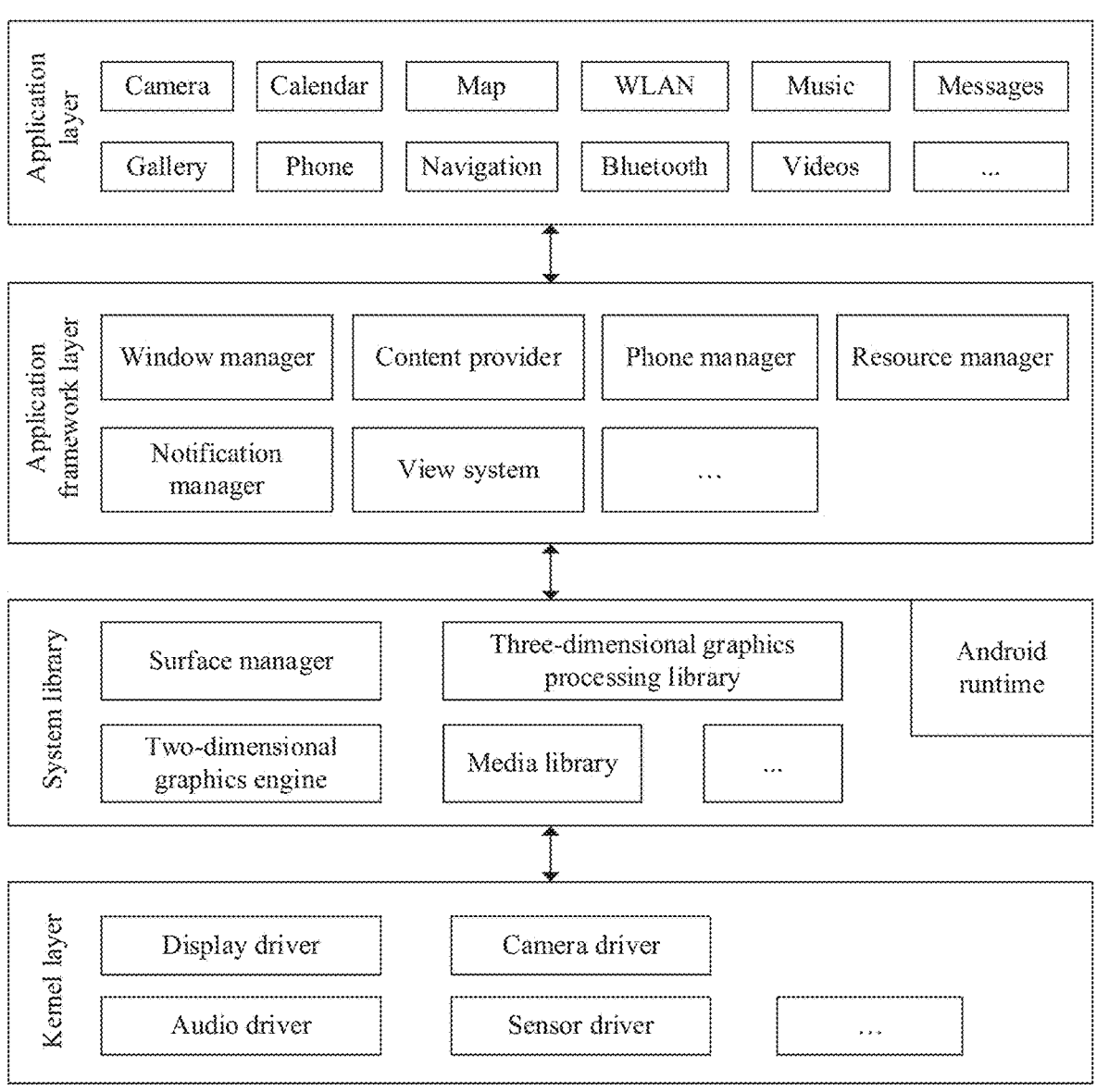
FIG. 1B is a block diagram of a software structure of an electronic device according to an embodiment of this application.

FIG. 1B is a block diagram of a software structure of the electronic device 100 shown in FIG. 1A according to an embodiment of this application.

In the layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom.

The application layer may include a series of application packages.

As shown in FIG. 113, the application packages may include applications such as Camera, Gallery, Calendar, Phone, Map, Navigation, WLAN, Bluetooth, Music, Videos, and Messages.

The application framework layer provides an application programming interface (application programming interface, API) and a programming framework for an application at the application layer. The application framework layer includes some predefined functions.

As shown in FIG. 1B, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to: store and obtain data, and enable the data to be accessed by an application. The data may include a video, an image, an audio, calls that are made and answered, a browsing history and bookmarks, an address book, and the like.

The view system includes visualized controls such as a control for displaying text and a control for displaying an image. The view system may be configured to construct an application. A display interface may include one or more views. For example, a display interface including a Messages notification icon may include a text display view and an image display view.

The phone manager is configured to provide a communication function for the electronic device 100, for example, management of a call status (including answering, declining, or the like).

The resource manager provides various resources such as a localized character string, an icon, an image, a layout file, and a video file for an application.

The notification manager enables an application to display notification information in a status bar, and may be configured to convey a notification message. The notification manager may automatically disappear after a short pause without requiring a user interaction. For example, the notification manager is configured to notify download completion, give a message notification, and the like. The notification manager may alternatively be a notification that appears in a top status bar of the system in a form of a graph or a scroll bar text, for example, a notification of an application running on the background, or may be a notification that appears on the display in a form of a dialog window. For example, text information is displayed in the status bar, an alert sound is played, the electronic device vibrates, or an indicator lamp blinks.

The Android runtime (Android Runtime) includes a core library and a virtual machine. The Android runtime is responsible for scheduling and management of the Android system.

The core library includes two parts: a performance function that needs to be invoked by Java language, and an Android core library.

The application layer and the application framework layer run on the virtual machine. The virtual machine executes Java files of the application layer and the application framework layer as binary files. The virtual machine is configured to implement functions such as object lifecycle management, stack management, thread management, security and exception management, and garbage collection.

The system library may include a plurality of functional modules, for example, a surface manager (surface manager), a media library (Media Library), a three-dimensional graphics processing library (for example, OpenGL ES), and a two-dimensional graphics engine (for example, SGL).

The surface manager is configured to: manage a display subsystem and provide fusion of 2D and 3D layers for a plurality of applications.

The media library supports playback and recording of audio and videos in a plurality of commonly used formats, static image files, and the like. The media library may support a plurality of audio and video coding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The two-dimensional graphics engine is a drawing engine for 2D drawing.

The kernel layer is a layer between hardware and software. The kernel layer includes at least a display driver, a camera driver, an audio driver, and a sensor driver.

The following describes an example of a working process of software and hardware of the electronic device 100 with reference to a capture photographing scenario.

When the touch sensor 180K in FIG. 1A receives a touch operation, a corresponding hardware interruption is sent to the kernel layer. The kernel layer processes the touch operation into an original input event (including information such as touch coordinates and a time stamp of the touch operation). The original input event is stored at the kernel layer. The application framework layer obtains the original input event from the kernel layer, and identifies a control corresponding to the input event. For example, the touch operation is a single-tap touch operation, and a control corresponding to the single-tap touch operation is a control of a camera application icon. A camera application invokes an interface of the application framework layer to open the camera application, then enables the camera driver by invoking the kernel layer, and captures a static image or a video by using the camera 193 shown in FIG. 1A.

In some embodiments, the foregoing displaying may be displaying by using a display. The display has a displaying function, and the display may have a touch function, or may not have a touch function, An operation on a touch display may be implemented by using a virtual key, or may be implemented by tapping the touchscreen. An operation on a non-touch display may be implemented by using a physical button.

Figure 2:
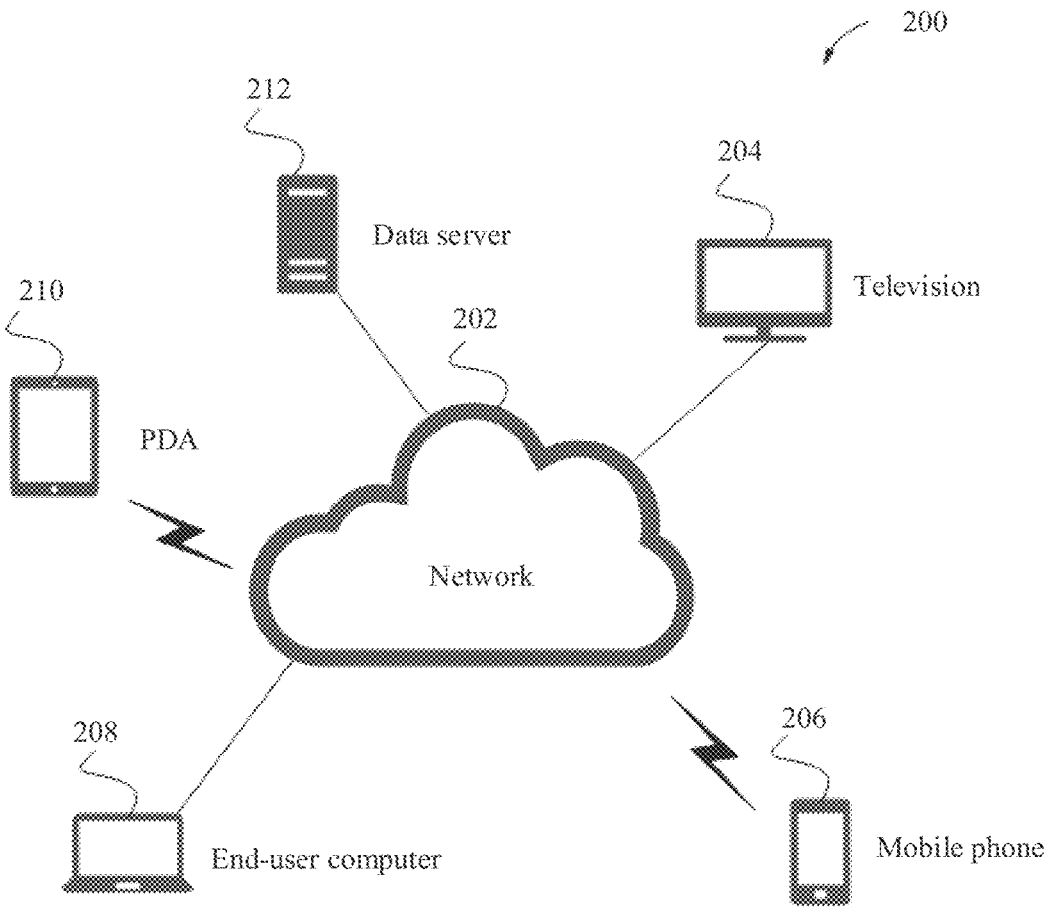
FIG. 2 is a schematic diagram of a network architecture according to an embodiment of this application.

FIG. 2 is a schematic diagram of a network architecture 200 according to an embodiment of this application. In an embodiment, the electronic device 100, for example, an intelligent terminal such as a smartphone or a smart television, may be configured to work in combination with the network architecture 200. As shown in the figure, at least one network 202 is provided. In the context of this network architecture 200, the network 202 may take any form, including but not limited to a telecommunication network, a local area network (local area network, LAN for short), a wireless network, and a wide area network (wide area network, WAN for short), such as the Internet, a peer-to-peer network, and a wired network. While only one network is shown, it should be understood that two or more similar or different networks 202 may be provided.

A plurality of devices are connected to the network 202. For example, a server computer 212 and an end-user computer 208 may be connected to the network 202 for communication, and the end-user computer 208 may include a desktop computer, a laptop computer, and/or any other type of computer. In addition, various other devices may also be connected to the network 202 including a personal digital assistant (personal digital assistant, PDA for short) device 210, a mobile phone device 206, a television 204, and the like. For another example, the mobile phone device 206 (for example, a smartphone) and the television 204 (for example, a smart television) may be connected to the network 202 (for example, the local area network) for communication to share content. The smartphone 206 or the smart television 204 and the server 212 may further be connected to the network 202 (for example, the wide area network) for communication, so that a user accesses server data on a terminal device, for example, accesses or downloads a video stream.

The following embodiments of this application provide a screen casting method, so that intelligent terminals, such as a smartphone and a smart television, can more conveniently and quickly push and display, for example, streaming media data during interconnection. For example, when the smartphone, performs screen casting to the smart television, a large screen end of the smart television can simultaneously display a video and at least one of scrolling comment information or external subtitle information.

Figure 3A:
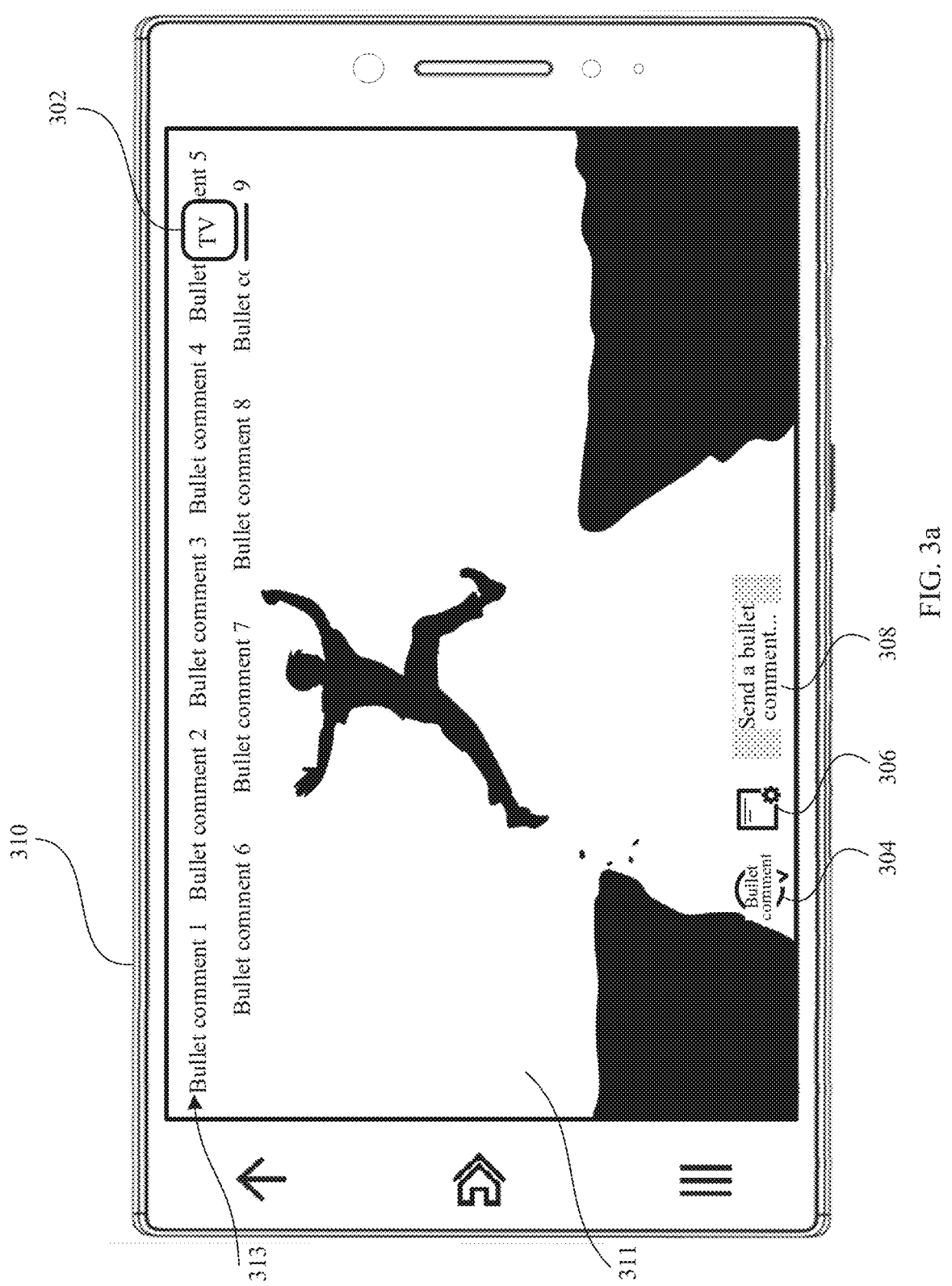
FIG. 3a to FIG. 3e are a schematic diagram of a scenario of a screen casting method according to an embodiment of this application.

FIG. 3a to FIG. 3e are a schematic diagram of a scenario of a screen casting method according to an embodiment of this application, for example, show a streaming data casting method. As shown in FIG. 3a, a first electronic device, for example, a first intelligent terminal 310, is watching a video on a first application. The first intelligent terminal 310 may be a mobile phone, a tablet computer, a smart wearable, a smart home device, or the like. In an embodiment of this application, the first intelligent terminal 310 is a device that is frequently used by a user and has a small screen. The first application may be any video website client, for example, iQIYI, Youku, or Tencent, or may be an application that supports playing of a video source in any video website, for example, WeChat or Weibo. Refer to FIG. 3a. When the user watches the video on the first intelligent terminal 310 such as the smartphone or the tablet computer, in addition to displaying a video image 311, an operation interface may be further displayed in the first application of the first intelligent terminal 310. FIG. 3a displays a part of a playback control interface related to the video content, including but not limited to a screen casting key 302, a scrolling comment key 304, a scrolling comment setting key 306, and a scrolling comment sending box 308. The operation interface may be displayed on the video image 311, or may be displayed in a display area different from that of the video image 311. This is not limited in this application.

In an embodiment, after the user selects a video to play on the first application, a scrolling comment or scrolling comment information 313 or external subtitle information (not shown in the figure) may be displayed along with the video image by default. In another embodiment, after playing the video, the user taps the scrolling comment key 304 to display the scrolling comment 313, and/or selects, by using a menu interface (not displayed in the figure), to display the external subtitle. When an animation of playing the scrolling comment 313 and the video image are played on the first application of the first intelligent terminal 310, the user may separately set a display parameter of the scrolling comment and send new scrolling comment information using the scrolling comment setting key 306 and the scrolling comment sending box 308.

When the user taps the screen casting key 302 on the first application, the first intelligent terminal 310 detects the screen casting operation, and starts to search for a device to which screen casting can be performed. A device search result may be presented on the intelligent terminal 310 in a form of a list for the user to select. Based on the selection of the user, the intelligent terminal 310 sends a screen casting request to a selected device for performing the screen casting. In another case, based on the selection of the user, the intelligent terminal 310 communicates with the selected device to send the screen casting request.

Figure 3B:
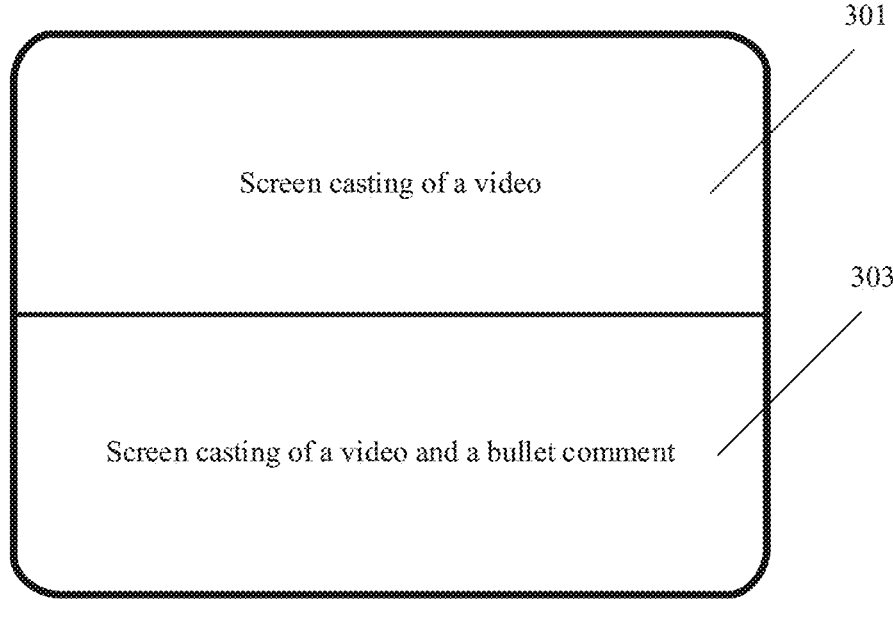
Figure 3C:
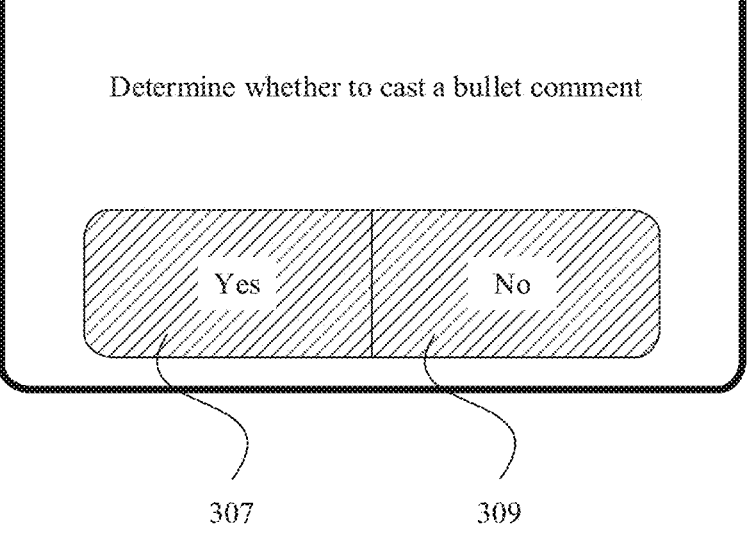

In an embodiment of this application, in response to the tapping of the user on the screen casting key 302, or in response to the selection of the user of the device for performing the screen casting, the intelligent terminal 310 may further display a menu bar or a pop-up window shown in FIG. 3b or FIG. 3c. For example, when the first application of the intelligent terminal 310 plays a video and displays the scrolling comment 313 in a superimposition manner, the user taps the screen casting key 302 and selects a target device for screen casting. In this case, the menu bar or the pop-up window shown in 3b is displayed on the intelligent terminal 310, so that the user selects "Screen casting of a video" 301 or "Screen casting of a video and a scrolling comment" 303, to perform video screen casting or screen casting of the video and the scrolling comment together based on an actual requirement of the user. For another example, when a video played by the first application on the intelligent terminal 310 has been screen casted to a target device, the user taps the scrolling comment key 304 on the intelligent terminal 310. In this case, a menu bar or pop-up window 305 shown in 3c is displayed on the intelligent terminal 310, so that the user selects whether to cast the scrolling comment. If the user selects "Yes" 307, the target device displays the scrolling comment on the video in a superimposition manner. If the user selects "No" 309, the target device does not display, in a superimposition manner, the scrolling comment on the video displayed on the target device, but may display the scrolling comment 313 on the intelligent terminal 310.

Figure 3D:
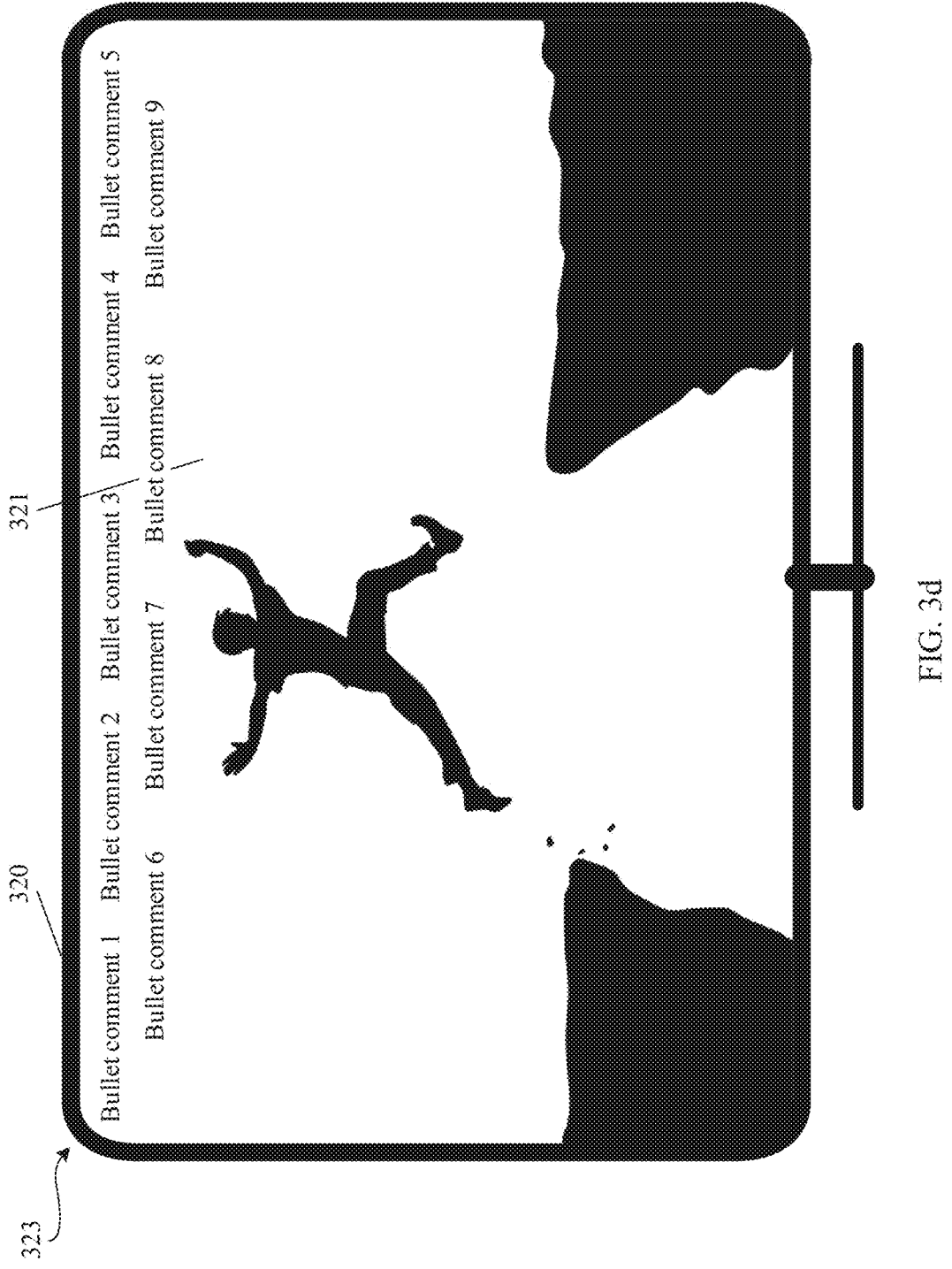

Refer to FIG. 3d. In the embodiment shown in FIG. 3d, the user selects a second electronic device, for example, a second intelligent terminal 320, to perform screen casting. The second intelligent terminal 320 may have a display larger than that of the first intelligent terminal 310. In an embodiment of this application, before the second intelligent terminal 320 displays screen casting content, the first intelligent terminal 310 determines whether a scrolling comment and/or an external subtitle are/is displayed in currently played video content, and if a determining result is "yes", the first intelligent terminal 310 pushes the scrolling comment and/or the external subtitle when pushing the video to the second intelligent terminal 320. As shown in FIG. 3d, when the screen casting starts, both a video image 321 and a scrolling comment 323 are displayed on the display of the second intelligent terminal 320. In another embodiment of this application, after the second intelligent terminal 320 has received a screen casting request of the first intelligent terminal 310 and displayed the video image 321, and after the first application of the first intelligent terminal 310 receives an operation of a user of tapping the scrolling comment key 304, scrolling comment information of the video image 321 is casted to the display of the second intelligent terminal 320, that is, the scrolling comment or the scrolling comment information 323 is displayed.

In an embodiment of this application, after the video image 311, the scrolling comment 313 and/or the external subtitle on the first intelligent terminal 310 are/is casted to the second intelligent terminal 320, the user may still control, by using play controls on the first intelligent terminal 310, the video image 321 displayed on the second intelligent terminal 320, including but not limited to video switching, fast-forward, rewind, volume control, and the like, and the user may further control, by using the first intelligent terminal 310, the scrolling comment 323 displayed on the second intelligent terminal 320, including but not limited to adjusting a scrolling comment parameter, sending a new scrolling comment, and the like. In addition, the user may also directly control the video image 321 and the scrolling comment 323 on the second intelligent terminal 320, including but not limited to the foregoing control operations.

After the video screen casting, because the scrolling comment and/or the external subtitle may be simultaneously displayed on the second intelligent terminal 320, a scenario in which scrolling comment interaction is performed while watching a video, and/or a scenario in which a corresponding subtitle is viewed while watching a video may continue to be provided for the user. Therefore, this application provides the user with a fast and convenient solution for displaying the scrolling comment and/or subtitle in a screen casting manner, so that entertainment of the user while watching a video is satisfied, and screen casting experience of the user can be greatly improved.

Figure 3E:
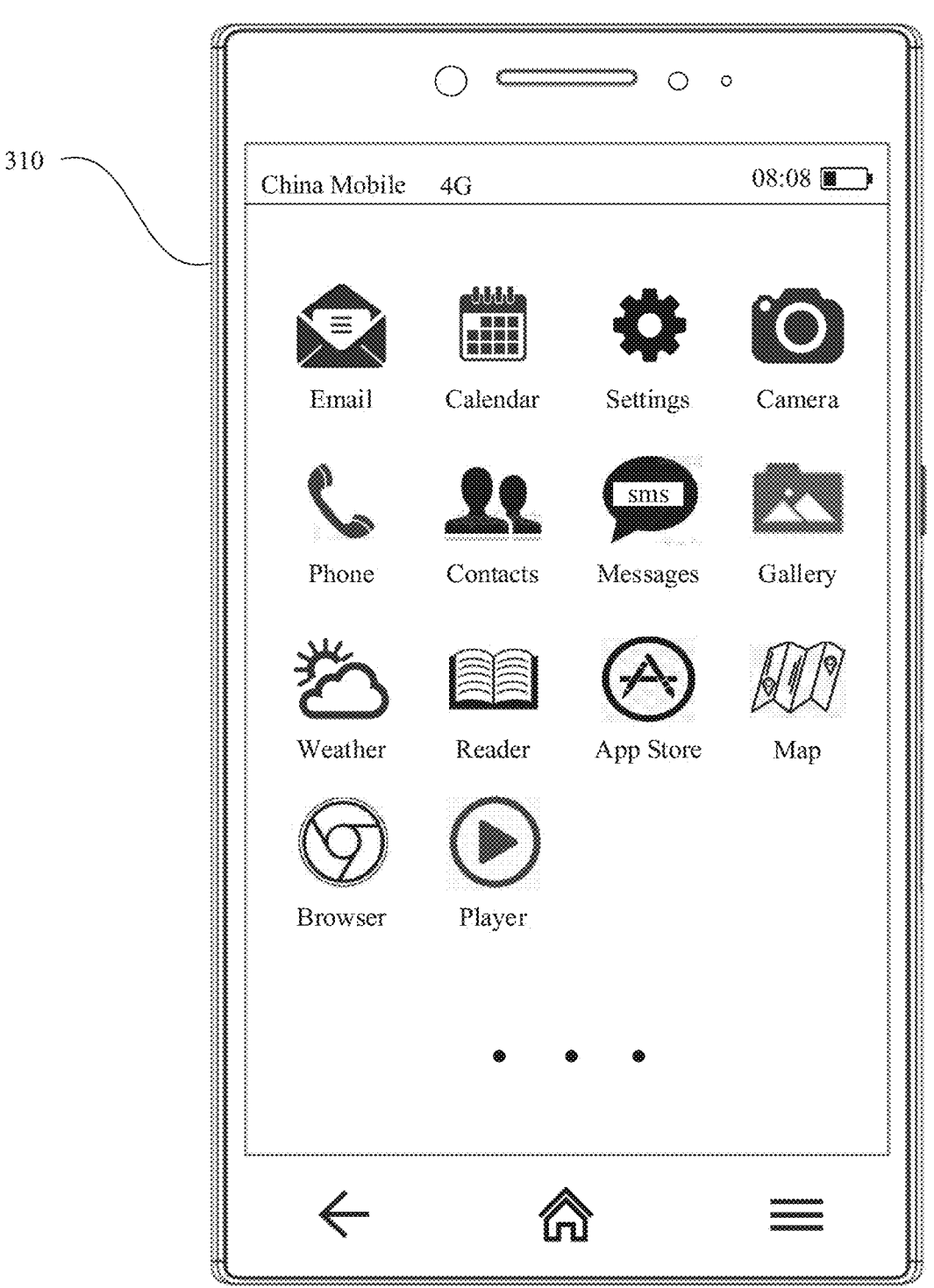

In this application, the first intelligent terminal 310 may be a portable intelligent device, and the second intelligent terminal 320 may be a smart television. After a video and a scrolling comment displayed on the portable intelligent device 310 is casted to the smart television 320 as shown in FIG. 3d, the portable intelligent device 310 may further exit the first application or exit the video display image, as shown in FIG. 3e, to perform another operation. Therefore, the first intelligent terminal 310 in this embodiment of this application implements screen casting of a video and a scrolling comment, and can freely and flexibly select a screen casting solution.

The "scrolling comment" mentioned in this application refers to commentary content that is about a video and that is provided by a video website client and that can be simultaneously displayed with the video, and is usually displayed on the video image in a superimposition manner. Any user watching the video may add scrolling comment information of the user to perform interaction, and the added scrolling comment information is displayed in a scrolling comment display area. The "display parameter" of the scrolling comment may be adjusted by using the scrolling comment setting key mentioned in this application. The display parameter may include but is not limited to the following scrolling comment parameters: a font, a font size, a color, transparency, an animation speed, a display area, a shielded user ID (account name), and the like. The "external subtitle" mentioned in this application is a subtitle different from an embedded subtitle of a video. Data of the external subtitle is separated from video data, and is not integrated together. The external subtitle needs to be separately imported to display in a video image, and is usually displayed below the video in a superimposition manner.

In this embodiment of this application, that the first intelligent terminal 310 performs "screen casting" means that at least a part of content displayed on the display of the first intelligent terminal 310 and at least a part of data related to the display content, including but not limited to a video, audio, text, and the like, are casted to another electronic device, for example, the second intelligent terminal 320, When an intelligent terminal needs to perform screen casting, a "device to which screen casting can be performed" searched by the intelligent terminal may be an electronic device that supports the screen casting in a same local area network (including a layer-2 local area network and connected to a same router), or may be not in the same local area network, but an electronic device that shares an electronic account with the first intelligent terminal 310 and implements interconnection by using another network (for example, a wired or wireless network).

In a specific embodiment of this application, a device to which screen casting can be performed and that is found by the first intelligent terminal is a device that supports a same screening casting protocol in a same local area network. The screen casting protocol may be a wireless projection protocol, for example, a technology or protocol such as Airplay or DLNA.

Figure 4A:
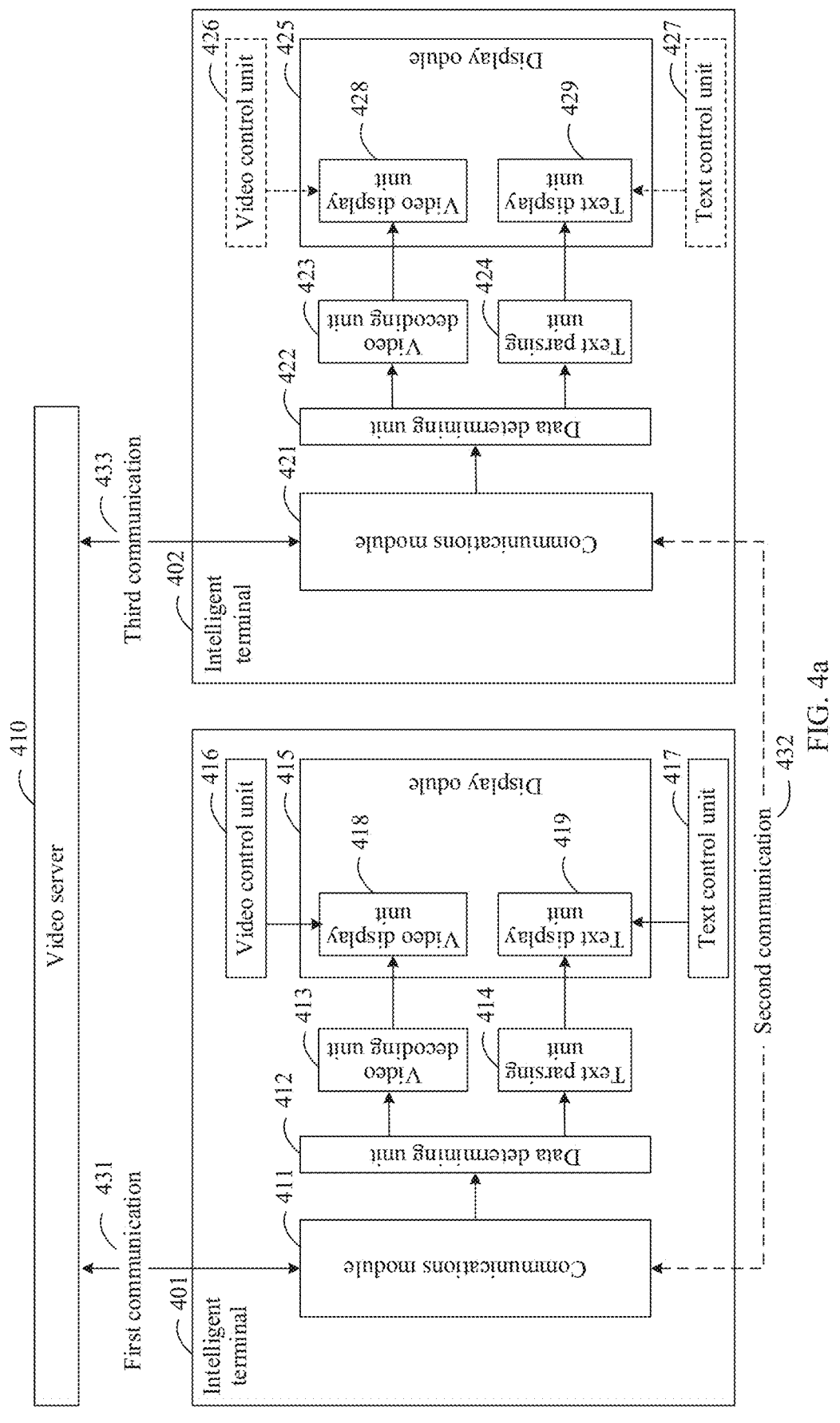
FIG. 4a and FIG. 4b are a schematic diagram of a module architecture of an intelligent terminal according to an embodiment of this application.
Figure 4B:
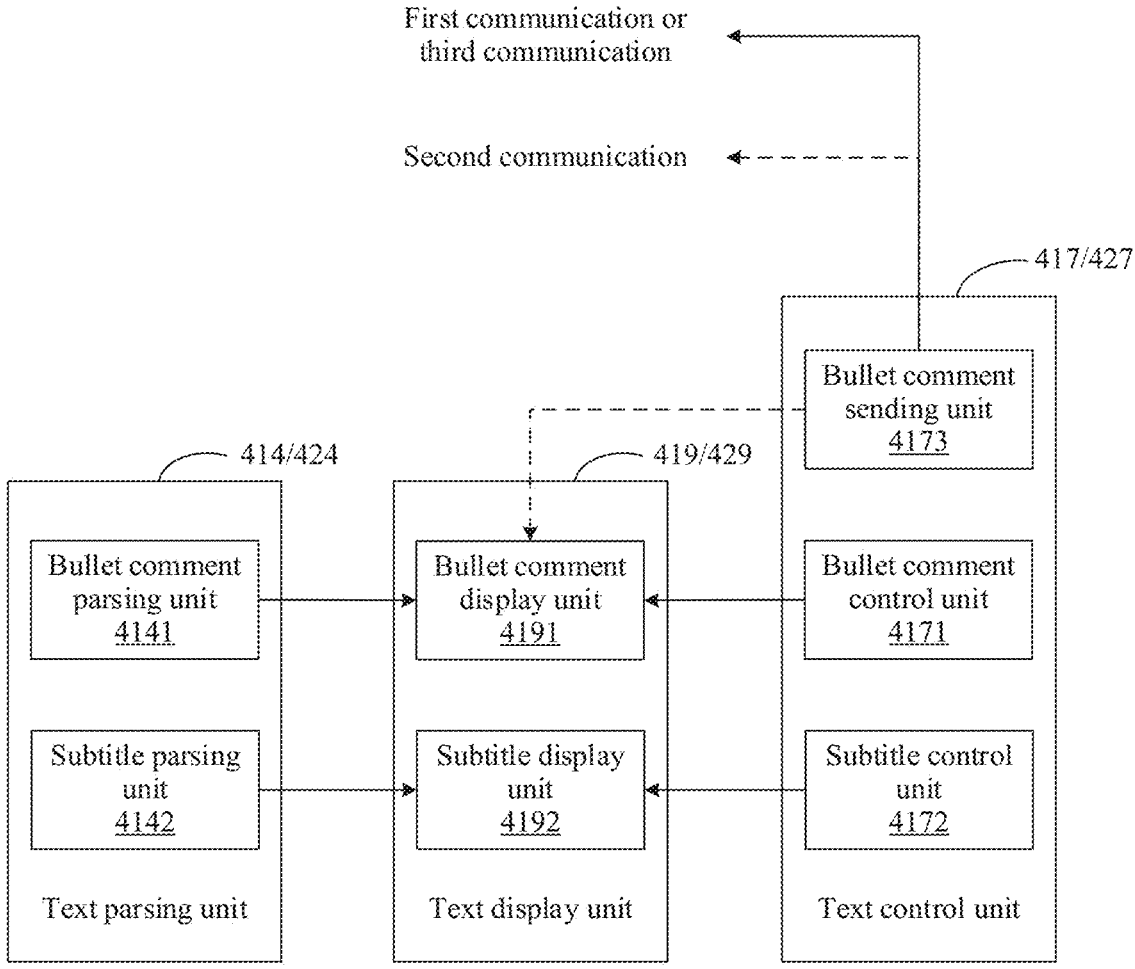

FIG. 4a and FIG. 4b are a schematic diagram of a module architecture of an intelligent terminal. FIG. 4a is a schematic diagram of architectures of and communication connections between a first intelligent terminal 401, a second intelligent terminal 402, and a video server 410 of a first application.

Refer to FIG. 4a The first intelligent terminal 401 includes a communications module 411, a data determining unit 412, a video decoding unit 413, a text parsing unit 414, a display module 415, a video control unit 416, and a text control unit 417. The display module 415 may further include a video display unit 418 and a text display unit 419. For ease of describing this embodiment of this application, FIG. 4a shows only modules related to video playing and text display in the first intelligent terminal 401. It should be understood that the first intelligent terminal 401 may further include more functional modules, as shown in FIG. 1A. Details are not described herein again. The first intelligent terminal 401 in this embodiment of this application may be a smartphone, and performs first communication 431 with the video server 410 by using the first application, to obtain video data and text data in the video server 410, and display the video data and the text data on the display module 415 of the first intelligent terminal 401.

The second intelligent terminal 402 includes a communications module 421, a data determining unit 422, a video decoding unit 423, a text parsing unit 424, a display module 425. The display module 425 may further include a video display unit 428 and a text display unit 429. The second intelligent terminal 402 in this embodiment of this application may be a smart television, and is interconnected with the first intelligent terminal 401, for example, a smartphone, by using a screen casting protocol. In an embodiment of this application, second communication 432 is performed between the smart television and the smartphone. The second intelligent terminal 402 further performs third communication 433 with the video server 410 by using data provided by the first intelligent terminal 401, to obtain the video data and the text data in the video server 410, and displays the video data and the text data on the display module 425 of the second intelligent terminal 402, to perform screen casting. It should be understood that the first communication 431, the second communication 432, and the third communication 433 may be communication in any form, for example, a wired or wireless communication method. This is not limited in this application. For example, the first intelligent terminal 401 and the second intelligent terminal 402 are in a local area network, and are connected to a router. The first communication 431, the second communication 432, and the third communication 433 may be implemented by using the router. In an embodiment of this application, the second intelligent terminal 402 may further include a video control unit 426 and a text control unit 427 (both represented by dashed-line boxes in the figure), to control playing of a casted video and display of a corresponding text. For ease of describing this embodiment of this application, FIG. 4a and FIG. 4b show only modules related to video playing and text display in the second intelligent terminal 402. It should be understood that the second intelligent terminal 402 may further include more functional modules, as show r in FIG. 1A. Details are not described herein again.

Refer to FIG. 4b. The text parsing unit 414/424 may include a scrolling comment parsing unit 4141 and/or a subtitle parsing unit 4142, the text display unit 419/429 may include a scrolling comment display unit 4191 and/or a subtitle display unit 4192, and the text control unit 417/427 may include a scrolling comment control unit 4171 and/or a subtitle control unit 4172. The text control unit 417/427 may further include a scrolling comment sending unit 4173.

The communications module 411 of the first intelligent terminal 401 and the communications module 421 of the second intelligent terminal 402 are configured to respectively perform first communication 431 and third communication 433 with the video server 410, to interconnect with each other to request and deliver streaming media and related data.

In an embodiment of this application, the first intelligent terminal 401 receives the video data and the text data from the video server 410 through first communication 431, the second intelligent terminal 402 receives data of a video download address and a text download address from the first intelligent terminal 401 through second communication 432, and the second intelligent terminal 402 receives the video data and the text data from the video server 410 through third communication 433.

The data determining unit 412 of the first intelligent terminal 401 and the data determining unit 422 of the second intelligent terminal 402 are configured to: determine a type of the data received from the video server 410, and transmit different data to different units based on a determining result, for example, transmit the video data to the video decoding units 413 and 423, and transmit the text data to the text parsing units 414 and 424. For example, when the data determining units 412 and 422 determine that scrolling comment data is received, the scrolling comment data is transmitted to the scrolling comment parsing unit 4141 shown in FIG. 4b. When the data determining units 412 and 422 determine that subtitle data is received, the subtitle data is transmitted to the subtitle parsing unit 4142 shown in FIG. 4b.

The video decoding units 413 and 423 decode the received video data and transmit the decoded video data to the video display units 418 and 428 to display the decoded video data on the display of the intelligent terminal. The text parsing units 414 and 424 parse the received text data and transmit the parsed text data to the text display units 419 and 429 to display, in a superimposition manner, the parsed text data on a video image played on the display. For example, the scrolling comment parsing unit 4141 parses the scrolling comment data to obtain scrolling comment information, and sends the scrolling comment information to the scrolling comment display unit 4191. The scrolling comment display unit 4191 renders the parsed scrolling comment information and displays the parsed and rendered scrolling comment information on the display of the intelligent terminal, and usually superimposes the parsed and rendered scrolling comment information on a top area of the video image for display. After parsing the subtitle data, the subtitle parsing unit 4142 sends the parsed subtitle data to the subtitle display unit 4192. The subtitle display unit 4192 renders the parsed subtitle data, displays the parsed and rendered subtitle data on the display of the intelligent terminal, and usually superimposes the parsed and rendered subtitle data on a bottom area of the video image for display.

The video control units 416 and 426 are configured to control a video displayed on the display, including but not limited to controlling pause, play, fast-forward, drag, and switch of the video. The text control units 417 and 427 are configured to control text displayed on the display. For example, the scrolling comment control unit 4171 is configured to control scrolling comment information on a video that is being played, including but not limited to controlling of a playing speed, a text font, a color, a size, a display area, and the like of the scrolling comment information. The subtitle control unit 4172 is configured to control subtitle data of a video that is being played, including but not limited to controlling of a font, a color, a size, a display area, switching and the like of the subtitle. The text control units 417 and 427 may further include the scrolling comment sending unit 4173, configured to send scrolling comment information on the intelligent terminal. The scrolling comment sending unit 4173 receives scrolling comment information entered by a user (for example, information entered by the user in the scrolling comment sending box 308 shown in FIG. 3a), and sends the scrolling comment information to the video server 410, to update, at the video server end, a scrolling comment data packet corresponding to the video, and deliver the scrolling comment data packet to a corresponding client in a form of streaming media. In an embodiment of this application, the scrolling comment sending unit 4173 sends the scrolling comment information to another intelligent terminal and displays the scrolling comment information on a display of the another intelligent terminal, and/or sends the scrolling comment information to local scrolling comment display units 419 and 429 to display the scrolling comment, so that a new scrolling comment newly sent by the user can be displayed on the display in real time, and better scrolling comment sending experience can be provided for the user.

Although only video screen casting is used as an example in this embodiment of this application to describe in detail the module architecture of the intelligent terminal and the screen casting solution of text information such as the scrolling comment, it should be understood that in another embodiment of this application, screen casting may be performed on other data, for example, audio data. When casted audio data includes text information such as a scrolling comment and/or lyrics, the scrolling comment and/or the lyrics information may be simultaneously casted according to the foregoing embodiment. It should be understood that, in this embodiment, the casted audio data is parsed by a local audio decoding unit of the intelligent terminal and played by an audio output unit. In a screen casting process of audio or other data, a screen casting solution in which the text information such as the scrolling comment and/or the lyrics is simultaneously casted needs to be similar to that in the foregoing embodiment. Therefore, details are not described herein again.

Figure 5A:
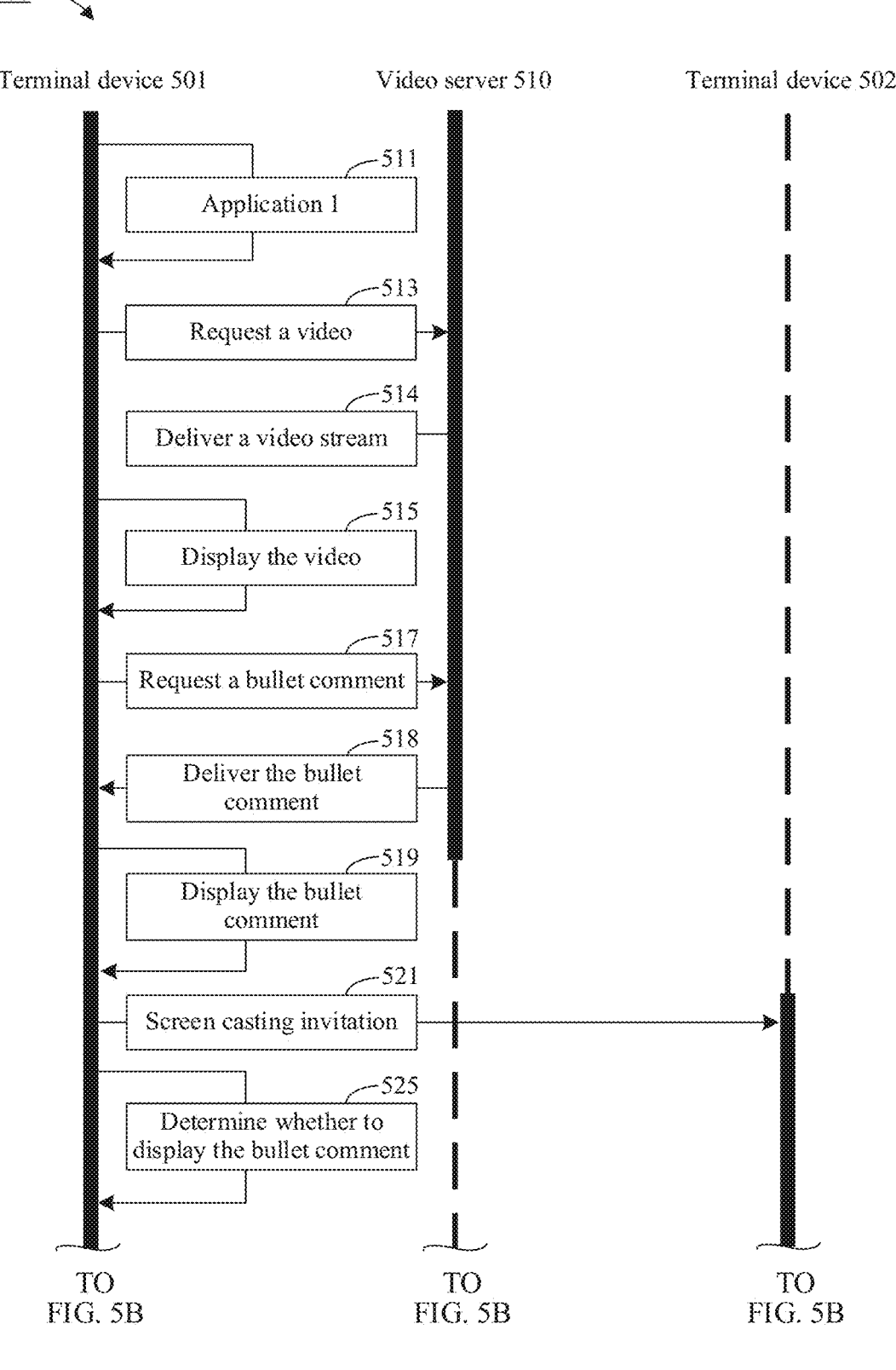
FIG. 5A and FIG. 5B are a message sequence diagram of a screen casting method according to an embodiment of this application.
Figure 8:
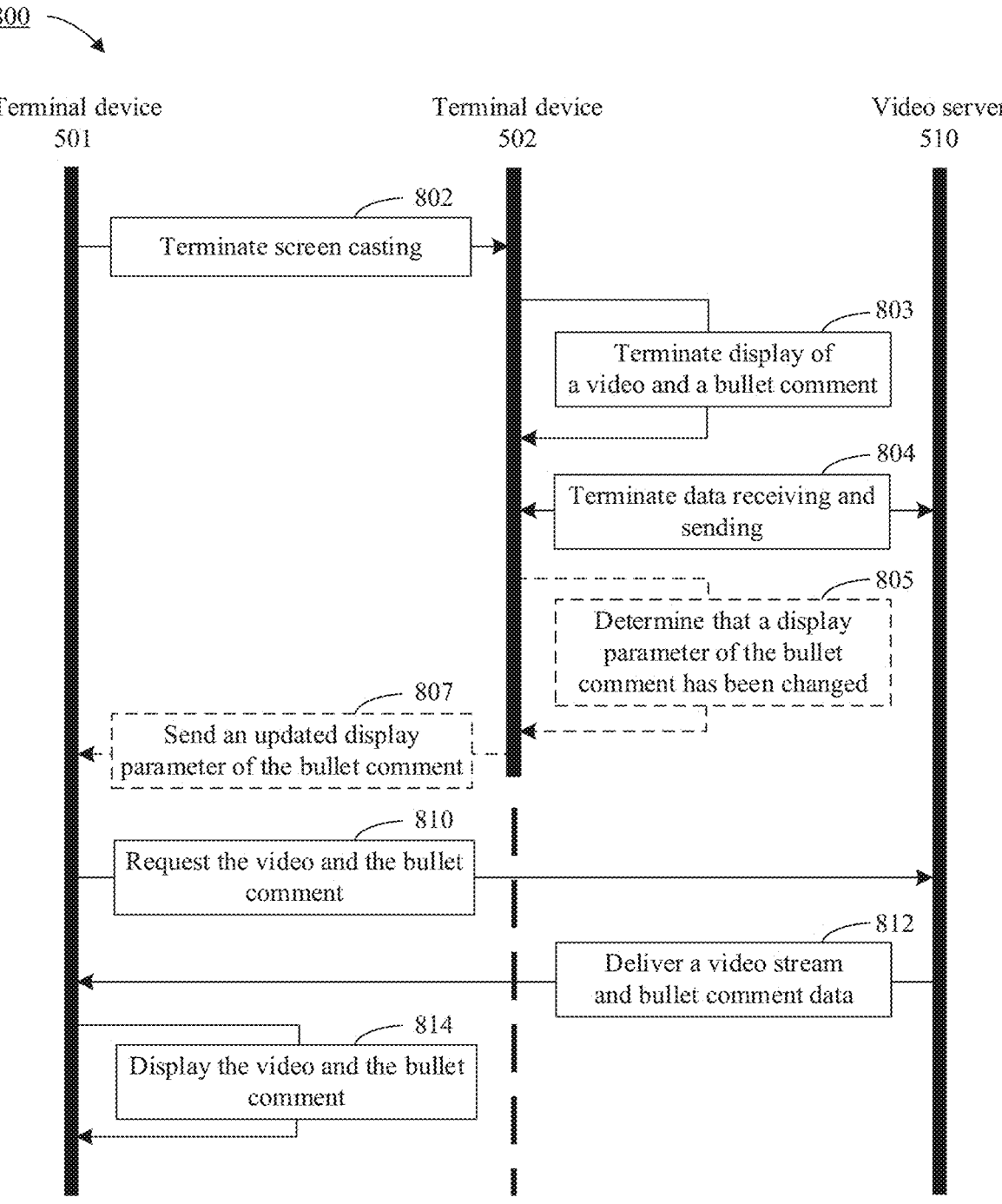
FIG. 8 is a message sequence diagram of a screen casting method according to an embodiment of this application.

The following uses scrolling comment information as an example to describe, with reference to the time sequence diagrams shown in FIG. 5A and FIG. 513 to FIG. 8, a process of displaying and controlling the scrolling comment information at a time point at which screen casting is performed, during screen casting, and at the end of screen casting in this embodiment of this application. It should be understood a process of displaying and controlling subtitle information is similar to the foregoing process.

Descriptions of FIG. 5A and FIG. 5B to FIG. 8 are performed with reference to the architectural diagram shown in FIG. 4a and FIG. 4b and the scenario diagram shown in FIG. 3a to FIG. 3e.

The following uses scrolling comment display and scrolling comment sending as examples to describe data request and delivery between an intelligent terminal and a video server in this application.

Figure 5B:
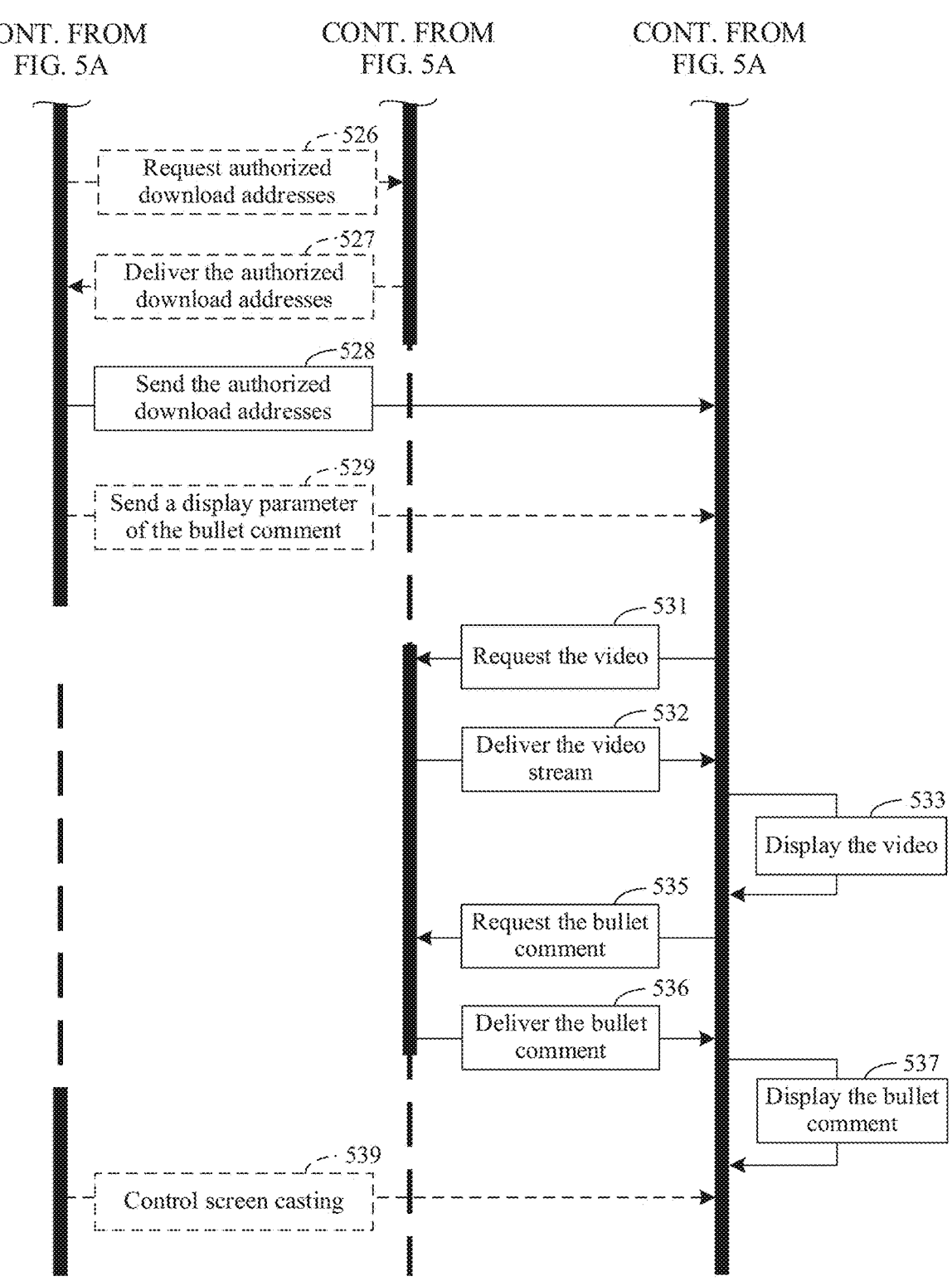

FIG. 5A and FIG. 5B to FIG. 8 each are a message sequence diagram of a screen casting method according to an embodiment of this application, for example, each show a streaming data casting method. FIG. 5A and FIG. 5B is a time sequence diagram 500 of performing screen casting between a source device and a screen casting device.

In the embodiment shown in FIG. 5A and FIG. 5B, the source device is a terminal device 501, and the screen casting device is a terminal device 502. In step 511, after the terminal device 501 opens an application 1 and selects a video, the terminal device 501 requests video data from a video server 510 in step 513. In response to the request, the video server 510 delivers the video data, for example, video stream data, to the terminal device 501 in step 514. Therefore, in step 515, as shown in FIG. 4a and FIG. 4b, when the data determining unit 412 determines that the received data is video data, the terminal device 501 transmits the video data to the video decoding unit 413 for decoding. After the video data is decoded, the video is displayed on the video display unit 418 of the terminal device 501, that is, a video image is displayed on a display. In a specific embodiment, the video server 510 delivers an authorized video download address to the terminal device 501 in response to the request of the terminal device 501 for obtaining the video, so that the terminal device 501 downloads the video. The video download address may be a URL (Uniform Resource Locator, uniform resource locator) address.

When the terminal device 501 detects an operation of opening a scrolling comment (for example, tapping a scrolling comment key 304 shown in FIG. 3a to FIG. 3e), in step 517, the terminal device 501 requests scrolling comment data from the video server 510. In response to the request, in step 518, the video server 510 delivers the scrolling comment data to the terminal device 501. Therefore, in step 519, as shown in FIG. 4a and FIG. 4b, when the determining unit 412 determines that the received data is scrolling comment data, the terminal device 501 transmits the scrolling comment data to the text parsing unit 414 for parsing. After the scrolling comment data is parsed, the scrolling comment information is displayed on the text display unit 419 of the terminal device 501, that is, the scrolling comment information is displayed on the video image on the display in a superimposition manner. As shown in FIG. 3a, the scrolling comment information is usually displayed on the top of the video image. Display of a subtitle is not shown in the figure. When the received text data is subtitle data, the subtitle information obtained after parsing is superimposed on the video image, and is usually displayed at the bottom. In a specific embodiment, the video server 510 delivers an authorized scrolling comment download address (for example, the URL) to the terminal device 501 in response to the request of the terminal device 501 for obtaining the scrolling comment, so that the terminal device 501 downloads the scrolling comment data. In this embodiment of this application, the scrolling comment may be an animation played on the display, may roll in or slide in from a right side of the display of the terminal device 501 to a left side, or may move in another direction of the display for display by using another animation effect. It should be understood that the animation effect of the scrolling comment should not be used as a limitation on this application.

When the source device 501 detects an operation of tapping the screen casting key 302, in step 521, the source device 501 selects the screen casting device 502 to send a screen casting request to perform screen casting. In step 525, the source device 501 determines whether scrolling comment information is being displayed in the application 1, and if a determining result is "yes", when requesting an authorized streaming data download address from the video server 510 in step 526, the source device 501 requests a video data download address and a scrolling comment data download address at the same time. In response to the request of the source device 501, in step 526, the video server 510 delivers the authorized video and scrolling comment data download addresses to the source device 501. In step 528, the source device 501 sends the received authorized download addresses to the screen casting device 502. In another embodiment of this application, steps 526 and 527 may be skipped. In this embodiment, after the source device 501 requests the video and the scrolling comment from the video server 510 (that is, steps 513 and 517), the video server 510 delivers the authorized video data download address and the authorized scrolling comment data download address. Therefore, the source device 501 may directly perform step 528 without performing steps 526 and 527. Specifically, the authorized video data and scrolling comment data download addresses may be added to the screen casting request sent by the terminal device 501 to the terminal device 502. Particularly, in an embodiment, when a user watches a video of on the terminal device 501 and performs a screen casting operation, if the terminal device 501 determines that both a subtitle and an external scrolling comment are displayed, a video download address, and the download addresses of the scrolling comment and the external subtitle authorized by the iQIYI are added to a screen casting request sent by the terminal device 501 to the terminal device 502.

For example, details are as follows:

Video download address: "videoSource": "http://video.iqiyi.com/source?p=9088&tk=skdhfsdf"

Scrolling comment download address: "bulletComments": "http://comment.iqiyi.com/c?id=skdhf"

Subtitle download address: "subtitle": "http://sub.iqiyi.com/source?id=89898"

A DLNA protocol is used as an example. The terminal device 501, for example, a smartphone, serves as a control point in the DLNA, the terminal device 502, for example, a smart television, serves as a media renderer, and the video server 510, for example, an iQIYI server, serves as a media server. In an embodiment of this application, after selecting a to-be-played video, the smartphone control point pushes a download address of the video source to the smart television media renderer, if the smartphone control point determines that corresponding scrolling comment information and/or external subtitle information are/is further displayed on the current video of an iQIYI APP (application, application) in a superimposition manner, the smartphone control point pushes a download address of the scrolling comment source and/or a download address of the external subtitle source to the smart television media renderer. Based on the received download addresses of the video source, the scrolling comment source, and/or the external subtitle source, the smart television media renderer obtains files such as the video source, the scrolling comment source, and/or the external subtitle source from the iQIYI server media server, and the iQIYI server media server may transmit these files to the smart television media renderer in a manner, for example, HTTP/HTTPS. After receiving the files such as the video source, the scrolling comment source, and/or the external subtitle source, the smart television media renderer renders these files, displays the video image on the display, and displays the scrolling comment and/or the external subtitle in the superimposition manner. The following fields may be added to the information pushed by the smartphone control point to the smart television media renderer by using the DLNA protocol:

dlna-playsingle://uuid:742b972e-3e50-4fa9-bc49-8dlac91587e5?sid=urn:upnp-org:serviceId:ContentDirectory dlna-bulletcomments: http://comment.iqiyi.com/c?id=skdhfsdf dlna-subtitle: http://sub.iqiyi.com/source?id=89898

In steps 531 and 535, the screen casting device 502 separately requests the video data and the scrolling comment data from the video server 510 based on the received video download address and scrolling comment download address, and separately delivers the video data and the scrolling comment data to the screen casting device 502 in steps 532 and 536. Therefore, in steps 533 and 537, as described in FIG. 4a and FIG. 4b, the screen casting device 502 transmits, by using the data determining unit 422, a part that is determined as the video data to the video decoding unit 423 for decoding, and transmits a part that is determined as the scrolling comment data to the text parsing unit 424 for parsing. The video and the scrolling comment information obtained through parsing are respectively loaded and displayed on the display of the terminal device 502 by using the video display unit 428 and the text display unit 429. It should be understood that, because the display of the scrolling comment is to enable the user to make a comment and interact with another user while watching the video, the scrolling comment data is related to playing time of the video, that is, some scrolling comment data is associated only with a segment of the video and should be displayed on an image when the segment of the video is played. In addition, in step 533, the video displayed on the screen casting device 502 should continue a video image that is cut off after the user taps the screen casting y on the source device or be images before and after the cut-off video image, and at the same time, in step 537, the scrolling comment information displayed on the screen casting device 502 should be scrolling comment information associated with the cut-off video image or the images before and after the cut-off video image. For example, when the source device 501 plays a video Video1 to 03'30" on the application 1, and the user taps the screen casting key, the video, when being casted to and played on the screen casting device 502, should be an image starting from the image at 03'30" or images before and after 03'30", for example, an image starting from 03'28". A scrolling comment displayed on the video image should be scrolling comment information associated with the video image at 03'30" or the video images before and after 03'30".

In a specific embodiment, an example of a part of a scrolling comment file that is parsed and that is received by the screen casting device 502 is as follows:

<d p=="51.593, 5, 25, 16711680, 1408852480, 0, 7fa769b4, 576008622"> scrolling comment 1</d.>

<d p="10.286, 1, 25, 16777215, 1408852600, 0, a3af4d0d, 576011065"> scrolling comment 2</d>

<d p="12.65, 1, 25, 16777215, 1408852761, 0, 24570b5a, 576014281"> scrolling comment 3</d>

<d p="19.033, 1, 25, 16777215, 1408852789, 0, cb20d1c7, 5760 14847"> scrolling comment 4</d>

<d p="66.991, 1, 25, 16777215, 1408852886, 0, a78e484d, 5760168199"> scrolling comment 5</d>

Content in the p field, for example, the first line of the scrolling comment file is as follows:

p="51.593, 5, 25, 16711680, 1408852480, 0, 7fa769b4, 576008622"

A plurality of pieces of data separated by commas are data related to a display parameter of the scrolling comment "excited". The data is an example and may be explained as follows:

A first parameter "51.593" represents a time point at which the scrolling comment appears in a video, and is in units of seconds.

A second parameter "5" represents an animation mode of the scrolling comment, 1 to 3 represent three different forms of rolling scrolling comment, 4 represents a bottom scrolling comment, 5 represents a top scrolling comment, 6 represents a reverse scrolling comment, 7 represents precise positioning, 8 represents an advanced scrolling comment, and the like.

A third parameter "25" represents a font size of the displayed scrolling comment, 12 represents a very small font, 16 represents an ultra small font, 18 represents a small font, 25 represents a medium font, 36 represents a large font, 45 represents a very large font, 64 represents an ultra large font, and the like.

A fourth parameter "16711680" represents a font color of the displayed scrolling comment, and in this embodiment, 10 digits of the HTML color are used.

A fifth parameter "1408852480" represents a timestamp in the Unix format.

A sixth parameter "0" represents a scrolling comment pool, 0 represents a common pool, 1 represents a subtitle pool, 2 represents a special pool (dedicated for the advanced scrolling comment), and the like.

A seventh parameter "7fa769b4" represents an account ID of a scrolling comment sender, which may be used to enable a function of "shielding the scrolling comment sender".

An eighth parameter "576008622" represents a row ID of the scrolling comment in a scrolling comment database, which may be used to enable a "historical scrolling comment" function.

After receiving, for example, the foregoing scrolling comment file, the screen casting device 502 renders the scrolling comment file on a local player, and then displays the scrolling comment file, in a superimposition manner, on the video image played on the display. The DLNA is used as an example, and a part of related code for rendering the scrolling comment in a player of a smart television is shown below. It should be understood that the code is merely used as an example, and should not be used as a limitation on the present invention.

Customized ViewGroup-XCDanmuView is implemented by inheriting RelativeLayout or inheriting another layout. An example of some code is as follows:

```
public class MyDanMuLayout extends RelativeLayout {
    private Context mContext;
    /******************** Constructor ********************/
    public MyDanMuLayout (Context context) {
        this (context, null);
    }
    public MyDanMuLayout (Context context, AttributeSet attrs) {
        this (context, attrs, 0);
    }
    public MyDanMuLayout (Context context, AttributeSet attrs, int defStyleAttr) {
        super (context, attrs, defStyleAttr);
        mContext = context;
        setWidthObserverOfLayout ( );
    }
    private int measuredWidthOfDanMuView;
    private int layoutWidth, layoutHeight;
    private Handler mHandler = new Handler ( );
```

-continued

```
    /*Perform global listening to obtain an actual width and height of
the customized layout, the width is used to calculate a distance that the
scrolling comment needs to move, and the height is used to calculate a
distance between each scrolling comment and the top)
    */
    private void setWidthObserverOfLayout ( ) {
        //Listen with this layout as the root, and after the layout is
complete, execute logic and remove the listener
        ViewTreeObserver observer = this. getViewTreeObserver ( );
        observer. addOnGlobalLayoutListener (new ViewTreeObserver.
OnGlobalLayoutListener ( ) {//When the global layout changes or a
visible state of a child view changes, the listener is called back
            @SuppressWarnings ("deprecation")
            @Override
            public void onGlobalLayout ( ) {//When a layout change is
detected, the listener is called back
                Log. d ("WidthObserverOfLayout," "Execute
                widthObserverOfLayout");
                getViewTreeObserver ( ). removeGlobalOnLayoutListener
                (this);
                //Remove the listener immediately once the listener is
                called back
                layoutWidth = getMeasuredWidth ( ); //Obtain the actual
width of the current customized layout
                layoutHeight = getMeasuredHeight ( ); //Obtain the actual
height of the current customized layout
                StartDanMuLooper ( ); //Start a queue loop
            }
        });
    }
```

Initialize a scrolling comment itemView. Herein, Text-View and ImageView are used as examples, and then are added to the customized danmuView by using addView. An example of some code is as follows:

```
    private void initDanMu (Context ctx, String danMuContent, final float
distanceToTopPercent, final int duration, int textColor, int bgColor,
Drawable drawable) {
        View danMuView;
        if (drawable == null) {//If it is determined that there is
no image, create a TextView, and if there is an image, create an
ImageView
            TextView tv_danMuTemp = new TextView (ctx); //Create a
scrolling comment TextView
            tv_danMuTemp. setText (danMuContent); //Set text information
of the scrolling comment
            tv_danMuTemp. setTextColor (textColor); //Set a text color of the
scrolling comment
            tv_danMuTemp. setBackgroundColor (bgColor); //Set a
background or border color of the scrolling comment
            danMuView = tv_danMuTemp;
        } else {
            ImageView iv_danMuTemp = new ImageView (ctx); //Create
a scrolling comment ImageView
            Set iv_danMuTemp. setImageDrawable (drawable); //Set, for
example, a profile picture of a star account
            iv_danMuTemp. setMaxWidth (200); //Set a maximum width
of an image
            iv_danMuTemp. setMaxHeight (200); //Set a maximum height of
the image
            danMuView = iv_danMuTemp;
        }
```

The TextView and ImageView are added to the XCDanmuView by using the addView to implement an effect of moving in from outside the screen. A scrolling comment location is coordinates. In a direction of moving from right to left, a newly generated danMuView is hidden to the rightmost of the layout, and then, the addView sets the location of the danMuView off the screen on the right. An example of some code is as follows:

```
    RelativeLayout. LayoutParams layoutParams = new RelativeLayout.
LayoutParams (LayoutParams. WRAP_CONTENT, LayoutParams.
WRAP_CONTENT); //Set an initial layout
    layoutParams. addRule (RelativeLayout.
ALIGN_PARENT_RIGHT); //Set the layout to the right
    layoutParams. rightMargin = −layoutWidth; //Continue to the right
until the new danMuView is hidden.
    addView (danMuView, layoutParams); //Add the scrolling comment
TextView or ImageView
    animate (danMuView, duration, distanceToTopPercent); //Duration
and a location of the scrolling comment View
    }
```

An attribute animation is used to implement translation of the scrolling comment iteinView that is randomly displayed from a left or right side, that is, to move the scrolling comment itemView from one end of the screen to the other end. After the animation ends, the view is removed from the XCDanmuView. Then, recreate a scrolling comment itemView, add the itemView to the XCDanmuView by using the addView, and start animation movement. An example of some code is as follows:

```
/* Start moving
 *
 * @param tv_danMuTemp
 */
private void startMovement (final View tv_danMuTemp, int duration) {
    float targetDistance = layoutWidth +
measuredWidthOfDanMuView; //Calculate a total distance to be moved
    ObjectAnimator animator = ObjectAnimator. ofFloat
(tv_danMuTemp, "translationX", −targetDistance); //Define the moving
animation ObjectAnimator
    animator. setDuration (duration * 1000); //Duration
    animator. setInterpolator (new LinearInterpolator ( )); //Move at a
    constant speed
    animator. addListener (new AnimatorListenerAdapter ( )
{//Animator listener, which rewrites an adapter
        @Override
        public void onAnimationEnd (Animator animation) {
            removeView (tv_danMuTemp); //Remove the view after the
animation is executed
            Log. d ("onAnimationEnd", "getChildCount: "+
getChildCount ( )); //Print a remaining space after removal
        }
    });
    animator. start ( ); //Everything is ready, and the animation starts
}
```

In an embodiment of this application, optionally, in step 529, the source device 501 may send a display parameter of a current scrolling comment to the screen casting device 502, so that when displaying the scrolling comment, the screen casting device 502 correspondingly matches the scrolling comment parameter displayed on the source device, for example, displaying four rows of scrolling comment information in blue in a largest font size.

In the technical solution of streaming screen casting provided in this embodiment of this application, when initiating the screen casting request, the source device 501 actively determines whether the scrolling comment and/or the external subtitle are/is displayed in the video to be casted, and based on the determining result "yes", actively sends the authorized download address of the scrolling comment data and/or the external subtitle data to the screen casting device 502, so that the screen casting device 502 requests the streaming data from the video server 510. In this way, in this embodiment of this application, the streaming screen casting solution for simultaneously performing screen casting on the video and the scrolling comment (and/or the external subtitle) data is implemented. In addition, because both the video data and the scrolling comment data of the screen casting device 502 are delivered by the video server 510, the screen casting device 502 and the video server 510 can communicate in a wired or wireless manner, to ensure smoothness of video playing and scrolling comment display in the screen casting, and improve screen casting experience of the user.

After the screen casting is performed between the source device 501 and the screen casting device 502, the source device 501 may continue to control the screen casting state in step 539, or may exit the current video interface on which the screen casting is performed, to browse another video guide in the application 1, or exit the application 1 to browse an interface of another application. Alternatively, the source device 501 enters a screen-off state, which does not interfere with the video and the scrolling comment displayed on the screen casting device 502.

After the screen casting, the user may further control and adjust the display of the scrolling comment, send scrolling comment information, and the like by using a user interaction interface displayed on the source device 501. For example, the user terminates or starts the display of the scrolling comment on the screen casting device by using the scrolling comment key 304 in FIG. 3a, adjusts the display parameter of the scrolling comment on the screen casting device by using the scrolling comment setting key 306, or sends a scrolling comment and displays the scrolling comment on the screen casting device by using the scrolling comment sending box 308.

In an embodiment of this application, when the user closes the scrolling comment from the source device 501 or the screen casting device 502, for example, taps the scrolling comment key 304 to close the display of the scrolling comment, an example of some code is as follows:

```
public void hideDanMu ( ) {
    for (int i = 0; i < getChildCount ( ); i++) {
        getChildAt (i). setVisibility (View. INVISIBLE);
    }
}
```

When the user re-opens the scrolling comment from the source device 501 or the screen casting device 502, for example, taps the scrolling comment key 304 to start the display of the scrolling comment, some pseudocode may be as follows:

```
public void showDanMu ( ) {
    for (int i = 0; i < getChildCount ( ); i++) {
        getChildAt (i). setVisibility (View. VISIBLE);
    }
}
```

Figure 6:
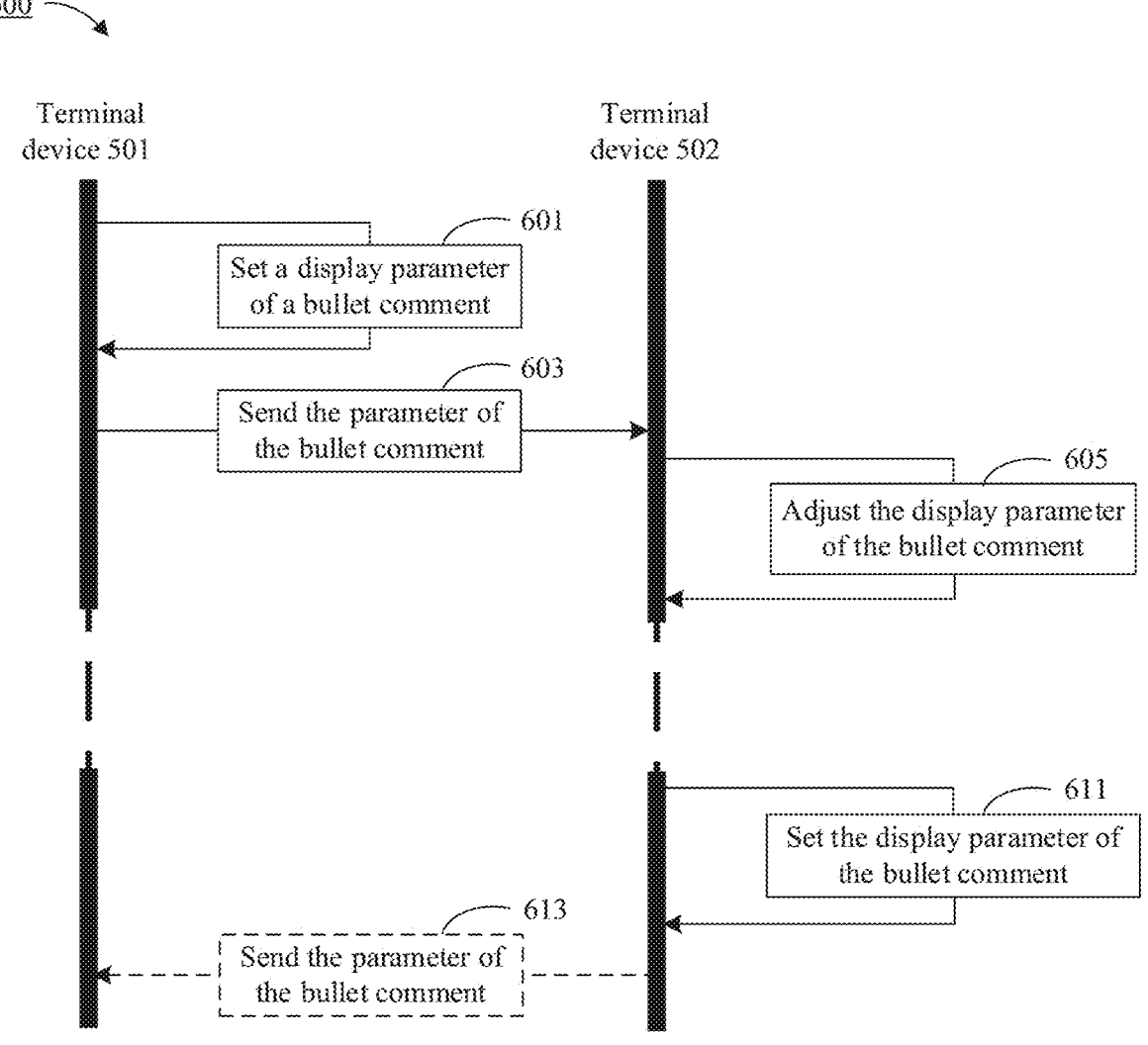
FIG. 6 is a message sequence diagram of a screen casting method according to an embodiment of this application.

FIG. 6 is a time sequence diagram 600 of adjusting a scrolling comment parameter in a screen casting process. In step 601, the user performs setting by using the user interaction picture on the terminal device 501, that is, the source device, and adjusts the display parameter of the scrolling comment by using the text control unit 417. When the source device 501 detects an operation performed by the user on the scrolling comment setting key 306 of the user interaction interface, the source device 501 pops up a scrolling comment setting window (not shown in the figure), which may include but is not limited to setting transparency (0-100%), a font size (small-standard-large-ultra large), a playing speed (slow-normal-2x-3x), a display area (10%-50%), a color, an animation effect, and the like of the scrolling comment. When the source device 501 detects that the setting of the scrolling comment parameter is completed, in step 603, the source device 501 sends the updated scrolling comment parameter to the screen casting device 502. In step 605, in response to the received scrolling comment parameter, the text control unit 427 of the screen casting device 502 adjusts, based on the scrolling comment parameter, the scrolling comment displayed on the text display unit 429, and the adjusted scrolling comment display corresponds to the setting performed by the user on the source device 501, or corresponds to display setting obtained after the text control unit 427 adapts some parameters accordingly.

In step 611, the user may further set the display parameter of the scrolling comment on the screen casting device 502. For example, the user, controls, by using a remote control of a smart television, a user interaction picture on the display for setting, and adjusts the display parameter of the scrolling comment by using the text display unit 429. In an embodiment of this application, step 613 is further included. The screen casting device 502 sends the updated display parameter of the scrolling comment to the source device 501, to update, on the source device 501, an adjustment/change performed by the user on the display parameter of the scrolling comment.

In the screen casting process, the user may freely choose whether to perform personalized setting on the display of the scrolling comment information on the source device or the screen casting device. Parameter setting of the scrolling comment performed on the source device may be correspondingly adapted to a current screen casting image on the screen casting device, to make a setting operation very convenient and flexible, Correspondingly, a change performed by the user on the display setting of the scrolling comment information on the screen casting device may also be updated to the source device, so that when the user switches to the source device to watch the video, the user can see the scrolling comment that has been correspondingly adapted to the change, and does not need to perform the setting again.

Figure 7:
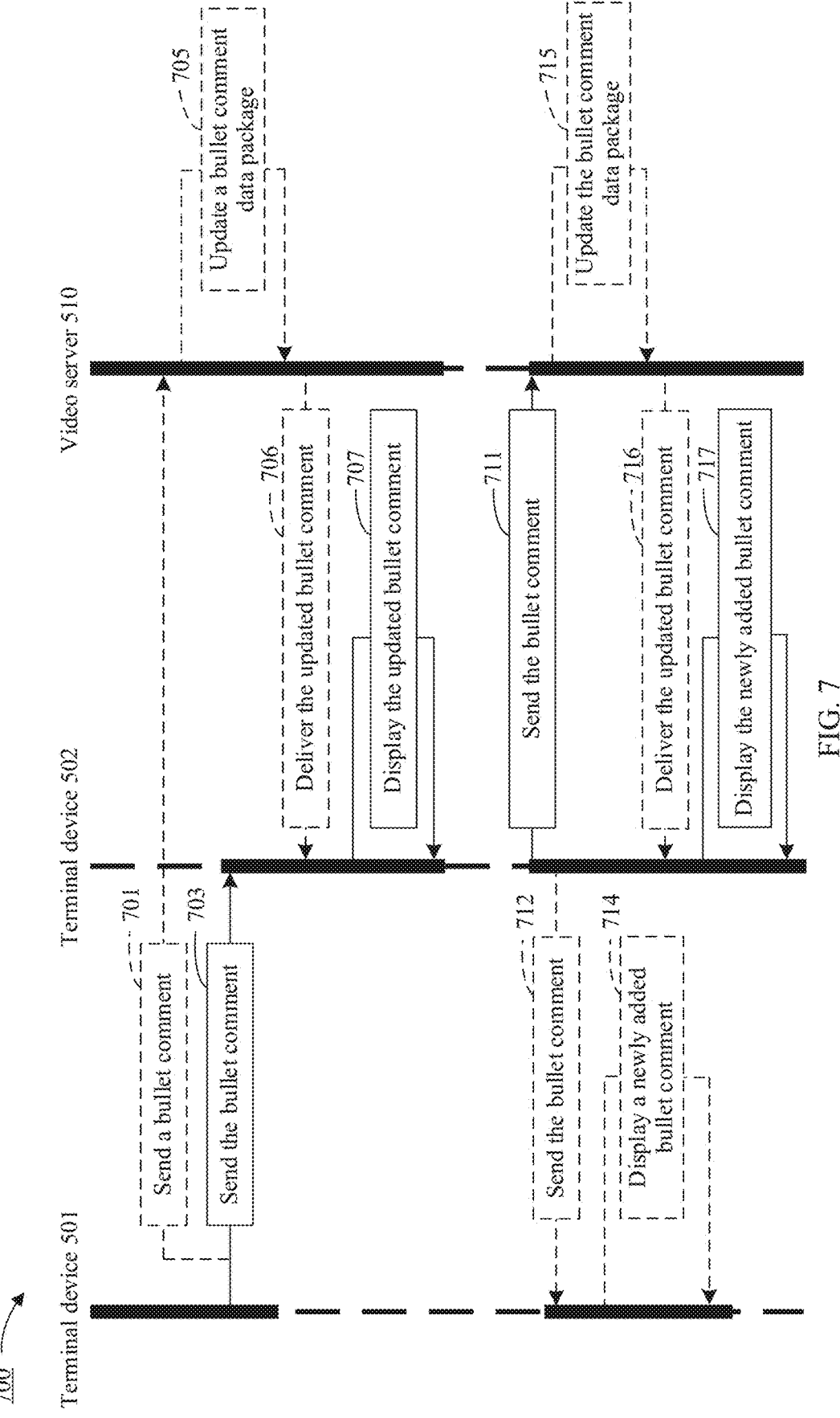
FIG. 7 is a message sequence diagram of a screen casting method according to an embodiment of this application.

FIG. 7 is a time sequence diagram 700 of sending a scrolling comment by a user by using two devices in a screen casting process. In step 703, the user edits to-be-sent scrolling comment information on the user interaction interface of the terminal device 501 by using the scrolling comment sending box 308, and sends the scrolling comment information by using the scrolling comment sending unit in the text control unit 417. When the terminal device 501 detects that the user enters the scrolling comment information and taps to send the scrolling comment information, the terminal device 501 encapsulates the scrolling comment information into scrolling comment data, and sends the scrolling comment data to the terminal device 502. In response to receiving the newly added scrolling comment data, the text parsing unit 424 of the terminal device 502 parses the scrolling comment data to obtain new scrolling comment information. In step 707, the parsed scrolling comment information is loaded/displayed in a currently displayed video image by using the text display unit 429, and the newly added scrolling comment information may slide into the display from the upper right corner of the display by using a slide-in animation effect.

In an embodiment of this application, in step 701, the terminal device 501 may further send the scrolling comment data to the video server 510. In step 705, the video server 510 updates, in response to the received scrolling comment data, a scrolling comment data packet corresponding to the scrolling comment data, and in step 706, sends the updated scrolling comment data packet to the terminal device 502, so that the terminal device 502 displays the newly added scrolling comment in step 707.

In another embodiment of this application, if the terminal device 501 still displays scrolling comment information on the display of the terminal device 501 after the screen casting, scrolling comment information newly sent by the user on the user interaction interface of the terminal device 501 is also displayed on the display of the terminal device 501 by using the slide-in animation effect.

Still refer to FIG. 7. In step 711, the user may further edit scrolling comment information on the user interaction interface of the terminal device 502, and sends the scrolling comment information by using the text control unit 427. A specific operation may be, for example, entering text information on a user interaction interface on a display by using a remote control of a smart television and tapping for sending. When detecting that the user sends the scrolling comment information through tapping, the terminal device 502 encapsulates the scrolling comment information into scrolling comment data and sends the scrolling comment data to the video server 510. In step 715, in response to the received scrolling comment data, the video server 510 updates a scrolling comment data packet corresponding to the scrolling comment data, and in step 716, sends the updated scrolling comment data packet to the terminal device 502. In step 717, the terminal device 502 controls the text display unit 429 by using the text control unit 427, so that the new scrolling comment information is displayed on the display of the terminal device 502 by using the slide-in animation effect.

In an embodiment of this application, steps 715 and 716 may be omitted. A new scrolling comment sent by the user on the terminal device 502 is directly displayed on the display of the terminal device 502, instead of being displayed after updated scrolling comment data from the video server 510 is received.

In another embodiment of this application, if the terminal device 501 still displays scrolling comment information on the display of the terminal device 501 after the screen casting, the terminal device 502 may also send, in step 712, scrolling comment data including new scrolling comment information to the terminal device 501. After the terminal device 501 parses the scrolling comment data by using the text parsing unit 414, in step 714, the terminal device 501 displays, on the display of the terminal device 501 by using the text display unit 417 with a slide-in animation effect, the scrolling comment information newly sent by the user.

An example of some code about that the user taps to send the scrolling comment and that the new scrolling comment slides in the source device 501 and/or the screen casting device 502 by using an animation effect is as follows:

```
/**
 * Open an interface externally to send a scrolling comment
 *
 * @param content   Text content
 * @param textColor Text color
 * @param bgColor   textView Background color
 */
public void sendDanMu (String content, int textColor, int bgColor) {
    DanMu danmu = new DanMu ( );
    danmu. content = content;
    danmu. distanceToTop = (float) Math. random ( );
    danmu. duration = 10;
    danmu. textColor = textColor;
```

-continued

```
        danmu. bgColor = bgColor;
        danMuQueue. ddd (danmu); //Add the scrolling comment object
        to a queue
}
/**
    * The scrolling comment slides in
    */
public void sendPlane ( ) {
        DanMu danmu = new DanMu ( );
        danmu. distanceToTop = (float) Math.random ( );
        danmu. duration = 10;
        danmu. drawable = mContext. getResources ( ). getDrawable
        (R. drawable. plane);
        danMuQueue. ddd (danmu); //Add the scrolling comment object
        to the queue
}
```

When watching the video, the user can have experience similar to real-time interaction through the scrolling comment display and the scrolling comment sending. In the video screen casting process, the user can still send a new scrolling comment from the source device end or the screen casting device end, and view the new scrolling comment sent just now when watching the video, to continue to participate in the "real-time interaction". Usually, the screen casting device has a larger display than the source device, so that the user can watch the video on the large display and perform the "real-time interaction", and interaction experience is improved.

FIG. 8 is a time sequence diagram 800 in which a video image and scrolling comment information continue to be displayed on a display of a source device 501 when screen casting between two devices is terminated. In step 802, when the terminal device 501 detects an operation of terminating screen casting by the user, for example, an operation of tapping the screen casting key 302 shown in FIG. 3a to FIG. 3e to end the screen casting, the terminal device 501 sends a termination request to the terminal device 502, and in response to the termination request, in step 803, the terminal device 502 controls, by using the video control unit 426 and the text control unit 427, the display module 425 to stop displaying a current video image and scrolling comment information. In step 804, data receiving and sending between the terminal device 502 and the video server 510 are terminated. In step 810, the terminal device 501 requests currently interrupted video data and scrolling comment data from the video server 510. In response to the request, in step 812, the video server 510 delivers, to the terminal device 501, the currently interrupted video image or video data and scrolling comment data before and after the currently interrupted video image, and in step 814, transmits, the decoded video and scrolling comment on the terminal device 501 by using the video decoding unit 413 and the text parsing unit 414, and displays the decoded video and scrolling comment on the display module 415.

In an embodiment of this application, as shown in FIG. 6, in step 611, the user sets the display parameter of the scrolling comment by using the screen casting device 502. In this case, because the source device 501 does not display any video image and/or scrolling comment information, a parameter change performed on the screen casting device 502 is not further sent to the source device 501. In this embodiment, when the user terminates the screen casting, as shown in FIG. 8, in step 805, the screen casting device 502 determines whether the display parameter of the scrolling comment is changed in the screen casting process, and if a determining result is "yes", in step 807, the screen casting device 502 sends a currently updated display parameter of the scrolling comment to the source device 501. Based on the display parameter of the scrolling comment received from the screen casting device 502, when displaying the scrolling comment on the display, the source device 501 performs corresponding adaptation based on the parameter.

In another embodiment of this application, after performing, on the screen casting device, display setting for a scrolling comment of a currently watched video, the user may not perform step 613 shown in FIG. 6, that is, a change of the display setting of the scrolling comment may not be updated to the source device 501. In addition, when the user terminates the screen casting, steps 805 and 807 shown in FIG. 8 may not be performed either, that is, the change of the display setting of the scrolling comment is still not updated to the source device 501. In this embodiment, the user may reserve a group of settings ConfigA for the display of the scrolling comment on the source device 501, and reserve another group of settings ConfigB for the display of the scrolling comment on the screen casting device 502. In addition, when the user changes the display setting of the scrolling comment on the source device 501 or the screen casting device 502 at any time, only a parameter in ConfigA or ConfigB is changed, and a change of the parameter in ConfigA does not affect the parameter in ConfigB and vice versa. This meets different requirements of the user on the display parameter of the scrolling comment on different devices.

Figure 9:
FIG. 9 is a flowchart of a screen casting method according to an embodiment of this application.

FIG. 9 is a flowchart 900 of a screen casting method according to an embodiment of this application, for example, shows a streaming data casting method. FIG. 9 is the flowchart 900 of the streaming data casting method performed on a terminal device 501, that is, a source device.

In step 901, the source device 501 plays a video on a first application, for example, an APP such as iQIYI or Youku. The video played on the source device 501 is a video stream delivered by a server of iQIYI, Youku, or the like. The server sends, to the source device 501, a download address of the video stream that the source device 501 requests to play. Based on the download address, the source device 501 may download corresponding video stream data, locally decode the video stream data by using the video decoding unit 413, and play the video stream data. The played video image is displayed on a display of the source device 501 by using the video display unit 418 in the display module 415.

In step 903, the source device 501 detects a screen casting operation performed by a user on an interface of the first application. For example, when the source device 501 detects that the user taps the screen casting key 302 on the video image, the source device 501 pops up a tab of a list of devices to which screen casting can be performed and that are detected in a current environment. The current environment refers to, for example, a local area network in which the source device 501 is currently located. In another embodiment of this application, the source device 501 may detect other intelligent devices that logged on to a current system account, and use these devices as the devices to Which screen casting can be performed. In step 903, if the source device 501 does not detect the screen casting operation, the source device 501 continues to play the current video.

In an embodiment of this application, the first application may respond to a fact that the user has selected to open a scrolling comment before exiting the application last time, and the scrolling comment is opened by default when the video is played this time. In this embodiment, scrolling comment information related to the video may be further displayed, in a superimposition manner, on the video image currently displayed by the source device 501.

In another embodiment of this application, the server of the first application may provide an external subtitle related to the video, and automatically deliver data of the external subtitle in response to selection of the user to play the video, Therefore, in this embodiment, the external subtitle information related to the video may be further displayed, in the superimposition manner, on the currently displayed video image received by the source device 501.

The following further describes, by using the scrolling comment as an example, the streaming data casting method provided in this embodiment.

In step 905, the source device 501 detects that the user selects a terminal device 502 to perform screen casting. The terminal device 502 may be a device that is in a same local area network as the source device and that supports a same screen casting protocol, for example, a smart television.

In step 907, the source device 501 detects, in the first application, whether a scrolling comment is displayed in a currently displayed video, that is, detects whether a scrolling comment function is currently enabled. When it is detected that the scrolling comment function is currently enabled, step 909 is performed.

In step 909, the source device 501 sends, to the screen casting device 502, a download address of scrolling comment data and a download address of video data that are authorized by the video server of the first application, for example, a scrolling comment download URI, and a video download URL.

After receiving the data download addresses sent by the source device 501, the screen casting device 502 obtains the video stream and the scrolling comment data from the video server by accessing the addresses. The video decoding unit 423 and the text parsing unit 424 of the screen casting device 502 respectively decode and parse the obtained video stream and scrolling comment data, and respectively display, by using the video display unit 428 and the text display unit 429 of the display module 425, the video and the scrolling comment information obtained through decoding and parsing. The scrolling comment information is loaded and superimposed on the video image, and is usually displayed on the top of the video image.

Figure 10:
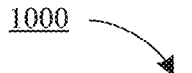
FIG. 10 is a flowchart of a screen casting method according to an embodiment of this application.
Figure 10:
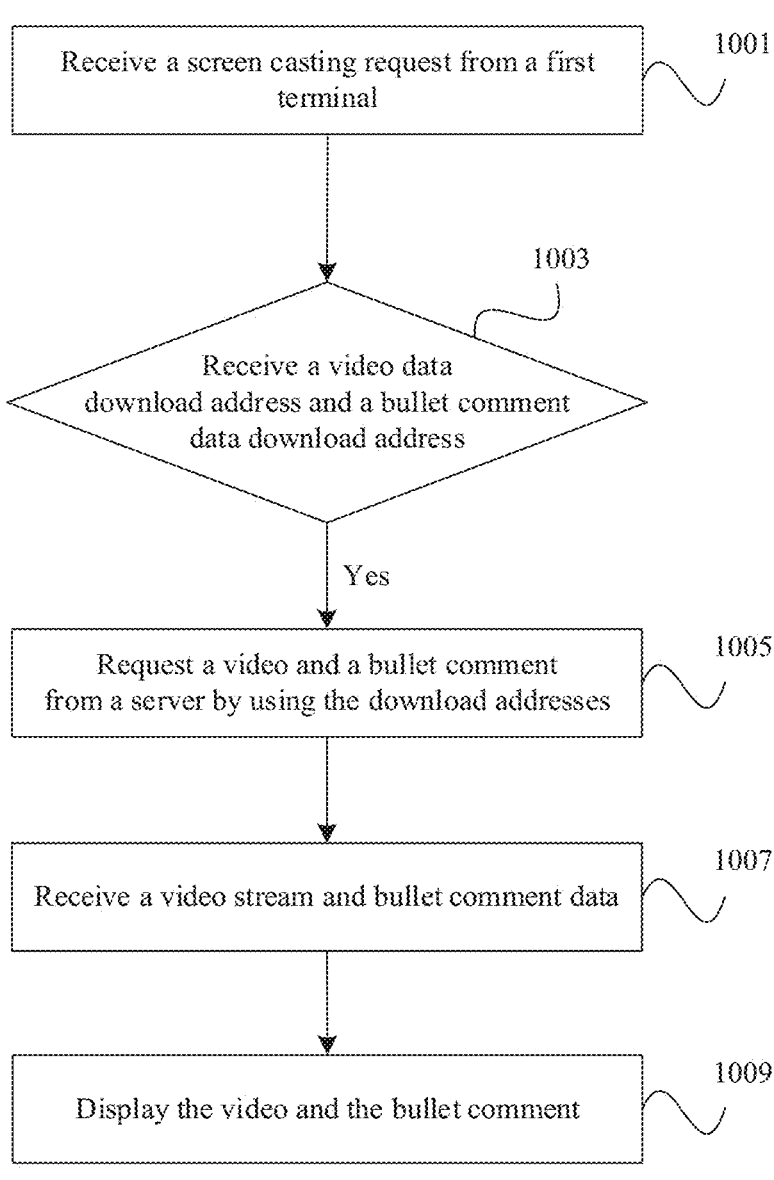

FIG. 10 is a flowchart 1000 of a screen casting method according to an embodiment of this application, for example, shows a streaming data casting method. FIG. 10 is the flowchart 1000 of the streaming data casting method performed on a terminal device 502, that is, a screen casting device.

In step 1001, the screen casting device 502 receives a screen casting request from a terminal device 501, that is, a source device.

In step 1003, the screen casting device 502 receives a download address of video data and a download address of scrolling comment data from the source device 501.

Specifically, a first determining unit on the screen casting device 502 separately determines a part belonging to the download address of the video data and a part belonging to the download address of the scrolling comment data, to separately request the video stream data and the scrolling comment data.

The download addresses of the video data and the scrolling comment data are authorized download addresses delivered by a video server 510 of a first application to the source device 501, or the download addresses may be delivered by the video server 510 to the source device 501 when the source device 501 requests a video from the video server

510. Alternatively, the download addresses may be the download addresses requested by the source device 501 from the video server when the source device 501 prepares to perform screen casting on the screen casting device 502, that is, after the source device 501 detects that a user taps the screen casting key 302, the source device 501 sends a request to the video server 510 while sending a screen casting invitation to the screen casting device 502, to request to deliver the authorized video data download address and scrolling comment data download address.

In step 1005, in response to the received video data download address and scrolling comment data download address, the screen casting device 502 accesses the addresses to request the video stream data and scrolling comment data.

Specifically, after determining that the screen casting device 502 is an authorized device, the video server 510 delivers requested video stream and scrolling comment data packets to the screen casting device 502.

In step 1007, the screen casting device 502 receives the video stream and scrolling comment data packets delivered by the video server.

Specifically, a data determining unit on the screen casting device 502 determines a type of the received data, sends the video data to a video decoding unit, and sends the scrolling comment data to a text parsing unit for parsing.

In step 1009, the display of the screen casting device 502 plays the video, and simultaneously superimposes the scrolling comment on the video image for display.

Specifically, the video decoding unit 423 of the screen casting device 502 decodes the received video stream and transmits the decoded video stream to the video display unit 428 of the display unit 425, to display the video image obtained by decoding on the display of the screen casting device 502. In addition, the text parsing unit 424 of the screen casting device 502 parses the received scrolling comment data and transmits the parsed scrolling comment data to the text display unit 429 of the display unit 425, to superimpose the scrolling comment information obtained through parsing on the video image and display the scrolling comment information on the display of the screen casting device 502.

It should be understood that although the foregoing embodiments are described by using the scrolling comment screen casting, the display after the scrolling comment screen casting, and the control after the scrolling comment screen casting as examples, this embodiment of this application may also implement subtitle screen casting and display and control after the subtitle screen casting. It should be understood that a process of downloading, parsing and displaying the subtitle is similar to that of the scrolling comment, and subtitle setting/parameter adjustment is also similar to that of the scrolling comment. A subtitle data casting process is not described herein, Therefore, a subtitle screen casting solution is not described in detail in this application.

According to the streaming data casting method provided in this application, when performing, based on a screen casting requirement of a user, video screen casting to a device to which screen casting can be performed, an intelligent device can further perform screen casting on text information such as a scrolling comment and/or a subtitle related to the video, and optionally set and control display and update of the text data on the source device and the screen casting device by using user interaction interfaces. The screen casting display and operation update of the text data help enhance an overall feeling and interaction experience of the user during video watching. Compared with a previous screen casting solution, embodiments of the present invention provide a very convenient and quick solution for performing screen casting on a scrolling comment and a subtitle that match a video, and further provide a flexible scrolling comment sending solution, a solution for flexibly adjusting a display parameter of the scrolling comment/subtitle, and the like. Therefore, experience and an interaction feeling of the user during video watching are greatly improved.

This application provides a computer program product including instructions. When the computer program product runs on a terminal (for example, the foregoing terminal device 501 or 502), the terminal is enabled to perform the steps in the streaming data casting method provided in embodiments of this application.

This application provides a computer-readable storage medium, including instructions. When the instructions are run on a terminal, the terminal is enabled to perform the steps in the streaming data casting method provided in embodiments of this application.

A person skilled in the art may clearly understand that embodiments of this application may be implemented by hardware, or by hardware and software. When embodiments of this application are implemented by hardware and software, the foregoing functions may be stored in a computer-readable medium. Based on such an understanding, the technical solutions of embodiments of this application essentially, or the part contributing to the conventional technology, or all or some of the technical solutions may be implemented in a form of a software product. The computer software product is stored in a storage medium, and includes several instructions for instructing a computer device (which may be a personal computer, a server, a network device, or the like) or a processor to perform all or some of the steps of the method described in embodiments of this application. The foregoing storage medium includes any medium that can store program code, such as a flash memory, a removable hard disk, a read-only memory, a random access memory, a magnetic disk, or an optical disc.

The foregoing descriptions are merely specific implementations of embodiments of this application, but are not intended to limit the protection scope of embodiments of this application. Any variation or replacement within the technical scope disclosed in embodiments of this application shall fall within the protection scope of embodiments of this application. Therefore, the protection scope of embodiments of this application shall be subject to the protection scope of the claims.

What is claimed is:

1. A screen casting method, applied to screen casting from a source device to a target device, the source device having a first display, the target device having a second display, wherein the method comprises:

receiving, by the source device, a-video data from a server and decoding the video data, and displaying the decoded video data through the first display;

receiving, by the source device, a scrolling comment information from the server and parsing the scrolling comment information, and displaying the parsed scrolling comment information through the first display, wherein the scrolling comment information is associated with the video data;

detecting, by the source device, a first operation of performing screen casting to the target device, the first operation is configured for screen casting of the video data and the scrolling comment information together;

in response to the first operation, receiving, by the target device, the video data and the scrolling comment information from the server according to a first download address of the video data and a second download address of the scrolling comment information;

displaying, by the target device, both the video data and the scrolling comment information through the second display;

detecting, by the source device, a second operation of sending first edited scrolling comment information; and in response to the second operation, additionally displaying, by the target device, the first edited scrolling comment information in the scrolling comment information, wherein the first edited scrolling comment information is associated with the video data.

2. The screen casting method according to claim 1, wherein the video data is a video stream, wherein the scrolling comment information and the first edited scrolling comment information are displayed in a superimposition manner on the video stream displayed on the second display, wherein the scrolling comment information is associated with the video stream in terms of time, and wherein the first edited scrolling comment information is associated with the video stream in terms of time.

3. The screen casting method according to claim 1, wherein the method further comprises:

downloading, by the target device, a first part of the video data by using the first download address, and displaying, by the target device, the first part of the video data through the second display; and downloading, by the target device, the scrolling comment information by using the second download address, and displaying, by the target device, a first part of the scrolling comment information on the second display in a superimposition manner, wherein the first part of the scrolling comment information is associated with the first part of the video data in terms of time.

4. A screen casting method, applied to a source device having a display, wherein the method comprises:

receiving video data from a server and decoding the video data, and displaying the decoded video data through the display;

receiving scrolling comment information from the server and parsing the scrolling comment information, and displaying the parsed scrolling comment information through the display, wherein the scrolling comment information is associated with the video data;

detecting a first operation of performing screen casting to a target device, wherein the first operation is configured for screen casting of the video data and the scrolling comment together;

in response to the first operation, transmitting, to the target device, first information indicating a first download address of the video data and a second download address of the scrolling comment information, such that upon receipt of the first information, the target device displays both the video data according to the first download address and the scrolling comment information according to the second download address;

detecting a second operation of sending edited scrolling comment information; and in response to the second operation, transmitting, to the target device, the edited scrolling comment information, such that upon receipt of the edited scrolling comment information, the target device additionally displays, the edited scrolling comment information in the scrolling comment information, wherein the edited scrolling comment information is associated with the video data.

5. The screen casting method according to claim 4, wherein the video data is a video stream, wherein the scrolling comment information and the edited scrolling comment information are displayed in a superimposition manner on the video stream, wherein the scrolling comment information is associated with the video stream in terms of time, and wherein the edited scrolling comment information is associated with the video stream in terms of time.

6. The screen casting method according to claim 4, wherein the method further comprises:

sending a display parameter of the scrolling comment information to the target device, wherein the display parameter comprises at least one of a font, a font size, a color, transparency, an animation speed, and a display area of displaying the scrolling comment information.

7. The screen casting method according to claim 4, wherein the method further comprises:

detecting a third operation of terminating screen casting to the target device; and receiving an updated display parameter of the scrolling comment information from the target device, wherein the updated display parameter comprises at least one of a font, a font size, a color, transparency, an animation speed, and a display area of displaying the scrolling comment information.

8. The screen casting method according to claim 4, wherein the method further comprises:

downloading, by the target device, a first part of the video data by using the download address of the video data, and displaying, by the target device, the first part of the video data through a second display of the target device; and downloading, by the target device, the scrolling comment information by using the download address of the scrolling comment information, and displaying, by the target device, a first part of the scrolling comment information on the second display in a superimposition manner, wherein the first part of the scrolling comment information is associated with the first part of the video data in terms of time.

9. A screen casting method, used for screen casting on a target device having a display, wherein the method comprises:

requesting, by using a first download address of video data, a server to deliver the video data;

requesting, by using a second download address of scrolling comment information, the server to deliver the scrolling comment information, wherein the scrolling comment information is associated with the video data;

displaying both the video data and the scrolling comment information through the display;

receiving first edited scrolling comment information, wherein the first edited scrolling comment information is configured to be sent from a source device that is screen casting to the target device; and displaying, in response to receiving the first edited scrolling comment information, the first edited scrolling comment information in the scrolling comment information, wherein the first edited scrolling comment information is associated with the video data.

10. The screen casting method according to claim 9, wherein the video data is a video stream, wherein the scrolling comment information is displayed in a superimposition manner on the video stream displayed on the display, wherein the scrolling comment information is associated with the displayed video stream in terms of time, and wherein the first edited scrolling comment information is associated with the video stream in terms of time.

11. The screen casting method according to claim 9, wherein the method further comprises:

receiving a display parameter of the scrolling comment information; and displaying the scrolling comment information on the display based on the display parameter, wherein the display parameter comprises at least one of a font, a font size, a color, transparency, an animation speed, and a display area of displaying the scrolling comment information.

12. The screen casting method according to claim 9, wherein the method further comprises:

detecting an operation of setting a display parameter of the scrolling comment information; and in response to the operation, displaying the scrolling comment information on the display based on the display parameter, wherein the display parameter comprises at least one of a font, a font size, a color, transparency, an animation speed, and a display area of displaying the scrolling comment information.

13. The screen casting method according to claim 1, wherein the method further comprises:

detecting, by the source device, a fourth operation of terminating the first display of the scrolling comment information on the target device; and in response to the fourth operation, displaying, by the target device, the video data through the second display without displaying the scrolling comment information.

14. The screen casting method according to claim 1, wherein the method further comprises:

in response to the second operation, sending, by the source device, the first edited scrolling comment information to the target device; and sending, by the source device, the first edited scrolling comment information to the server.

15. The screen casting method according to claim 1, wherein the method further comprises:

detecting, by the target device, a fifth operation of sending second edited scrolling comment information; and in response to the fifth operation, additionally displaying, by the target device, the second edited scrolling comment information in the scrolling comment information, wherein the second edited scrolling comment information is associated with the video data.

16. The screen casting method according to claim 4, wherein the method further comprises detecting a fourth operation of terminating display of the scrolling comment information on the target device, wherein the fourth operation is configured for terminating screen casting of the scrolling comment information.

17. The screen casting method according to claim 4, wherein the method further comprises, in response to the second operation, sending the edited scrolling comment information to the server.

18. The screen casting method according to claim 9, wherein the method further comprises, in response to a fourth operation of terminating screen casting of the scrolling comment information on the source device, displaying the video data through the display without displaying the scrolling comment information.

19. The screen casting method according to claim 9, wherein the method further comprises:

detecting a fifth operation of sending second edited scrolling comment information; and in response to the fifth operation, additionally displaying the second edited scrolling comment information in the scrolling comment information, wherein the second edited scrolling comment information is associated with the video data.

20. A terminal comprising:

a display; and a processor configured to:

receive video data from a server and decoding the video data, and displaying the decoded video data through the display;

receive scrolling comment information from the server and parsing the scrolling comment information, and displaying the parsed scrolling comment information through the display, wherein the scrolling comment information is associated with the video data;

detect a first operation of performing screen casting to a target device, wherein the first operation is configured for screen casting of the video data and the scrolling comment together;

in response to the first operation, transmit, to the target device, first information indicating a first download address of the video data and a second download address of the scrolling comment information, such that upon receipt of the first information, the target device displays both the video data according to the first download address and the scrolling comment information according to the second download address;

detect a second operation of sending edited scrolling comment information; and in response to the second operation, transmit, to the target device, the edited scrolling comment information, such that upon receipt of the edited scrolling comment information, the target device additionally displays the edited scrolling comment information in the scrolling comment information, wherein the edited scrolling comment information is associated with the video data.

21. The terminal according to claim 20, wherein the video data is a video stream, wherein the scrolling comment information and the edited scrolling comment information are displayed in a superimposition manner on the video stream, wherein the scrolling comment information is associated with the video stream in terms of time, and wherein the edited scrolling comment information is associated with the video stream in terms of time.

22. The terminal according to claim 20, wherein the processor is further configured to detect a fourth operation of terminating display of the scrolling comment on the target device, wherein the fourth operation is configured for terminating screen casting of the scrolling comment information.

23. The terminal according to claim 20, wherein the processor is further configured to:

in response to the second operation, send the edited scrolling comment information to the target device; and send the edited scrolling comment information to the server.

* * * * *